(12) United States Patent
Watanabe et al.

(10) Patent No.: US 6,882,398 B2
(45) Date of Patent: Apr. 19, 2005

(54) LIQUID-CRYSTAL DISPLAY DEVICE AND METHOD OF FABRICATING SAME

(75) Inventors: Makoto Watanabe, Tokyo (JP); Tsutomu Kadotani, Tokyo (JP); Takeshi Sasaki, Tokyo (JP); Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 7 days.

(21) Appl. No.: 10/124,031

(22) Filed: Apr. 17, 2002

(65) Prior Publication Data

US 2002/0167634 A1 Nov. 14, 2002

(30) Foreign Application Priority Data

Apr. 17, 2001 (JP) ........................................ 2001-118115
Jul. 30, 2001 (JP) ........................................ 2001-230113

(51) Int. Cl.⁷ .......................................... G02F 1/1339
(52) U.S. Cl. ........................................................ 349/153
(58) Field of Search ................................. 349/153, 190

(56) References Cited

U.S. PATENT DOCUMENTS 5,982,470 A * 11/1999 Nakahara et al. ........... 349/153
6,424,394 B1 * 7/2002 Morii .......................... 349/110
6,473,147 B1 * 10/2002 Nakahara et al. ........... 349/153
6,573,115 B1 * 6/2003 Kwak et al. .................. 438/30

FOREIGN PATENT DOCUMENTS

JP    2000-11241    2/2000
JP    2000-77285    12/2000

* cited by examiner

Primary Examiner—Tarifur R. Chowdhury
Assistant Examiner—Richard Kim
(74) Attorney, Agent, or Firm—Choate, Hall & Stewart LLP

(57) ABSTRACT

A LCD device that receives curing light sufficiently to thereby realize approximately uniform curing of the material of the sealing member without eliminating the conductive light-blocking members. A first substrate has a display area and a peripheral area located to surround the display area. The display area includes pixels arranged regularly. The peripheral area includes a sealing member, wiring lines connected to the pixels, and conductive light-blocking members. A second substrate is coupled with the first substrate. A liquid crystal layer is formed between the first and second substrates. The sealing member is formed to overlap with the wiring lines and the light-blocking members in such a way that a non-overlapping area of the sealing member with the wiring lines and the light-blocking members is equal to 25% per unit area of the sealing member or greater.

17 Claims, 24 Drawing Sheets

(1) FORM SEALING MEMBER
(2) DRIP LC & COUPLE SUBSTRATES
(3) IRRADIATE UV & TEMPORAL CURE
(4) FINAL CURE

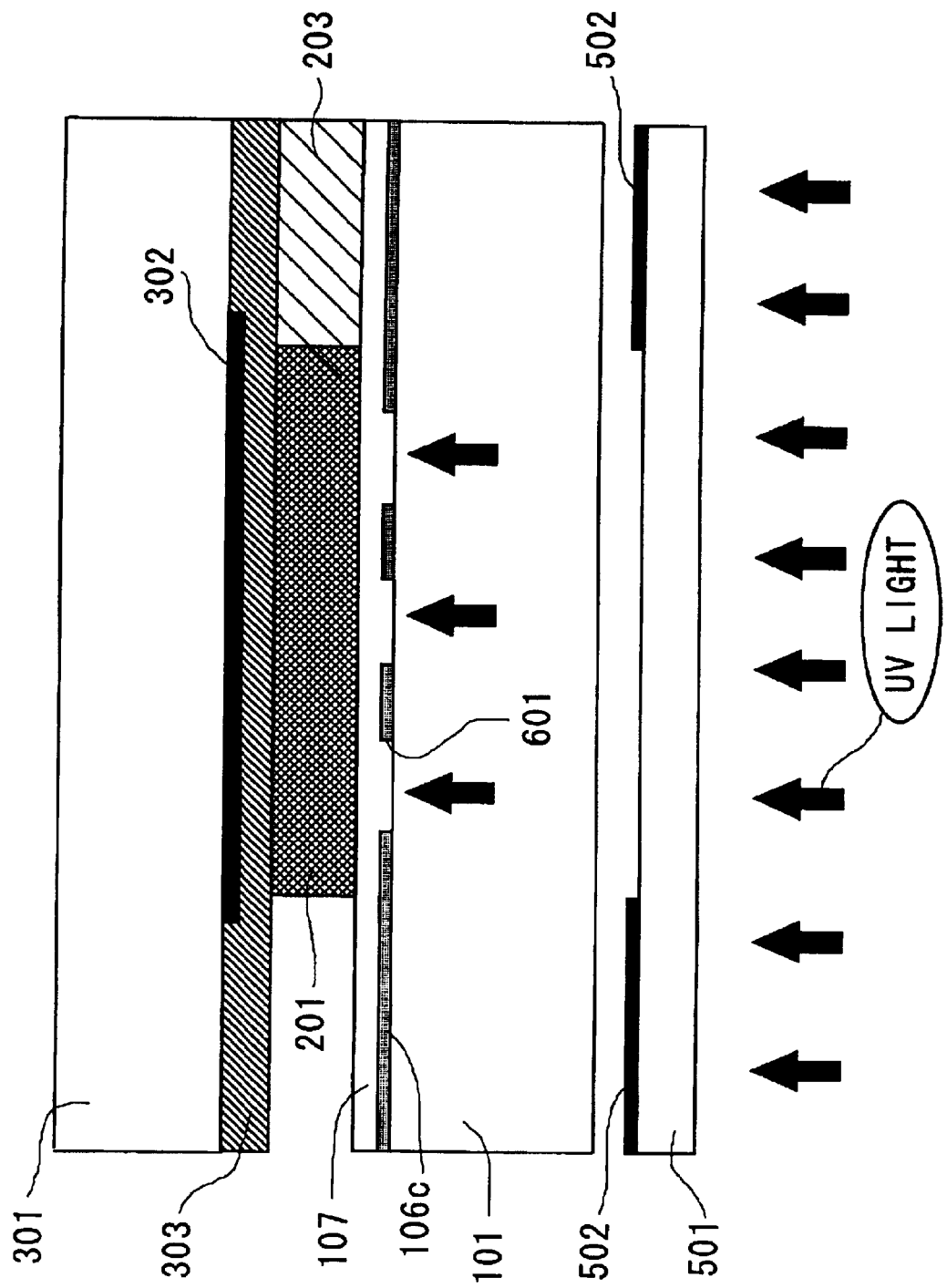

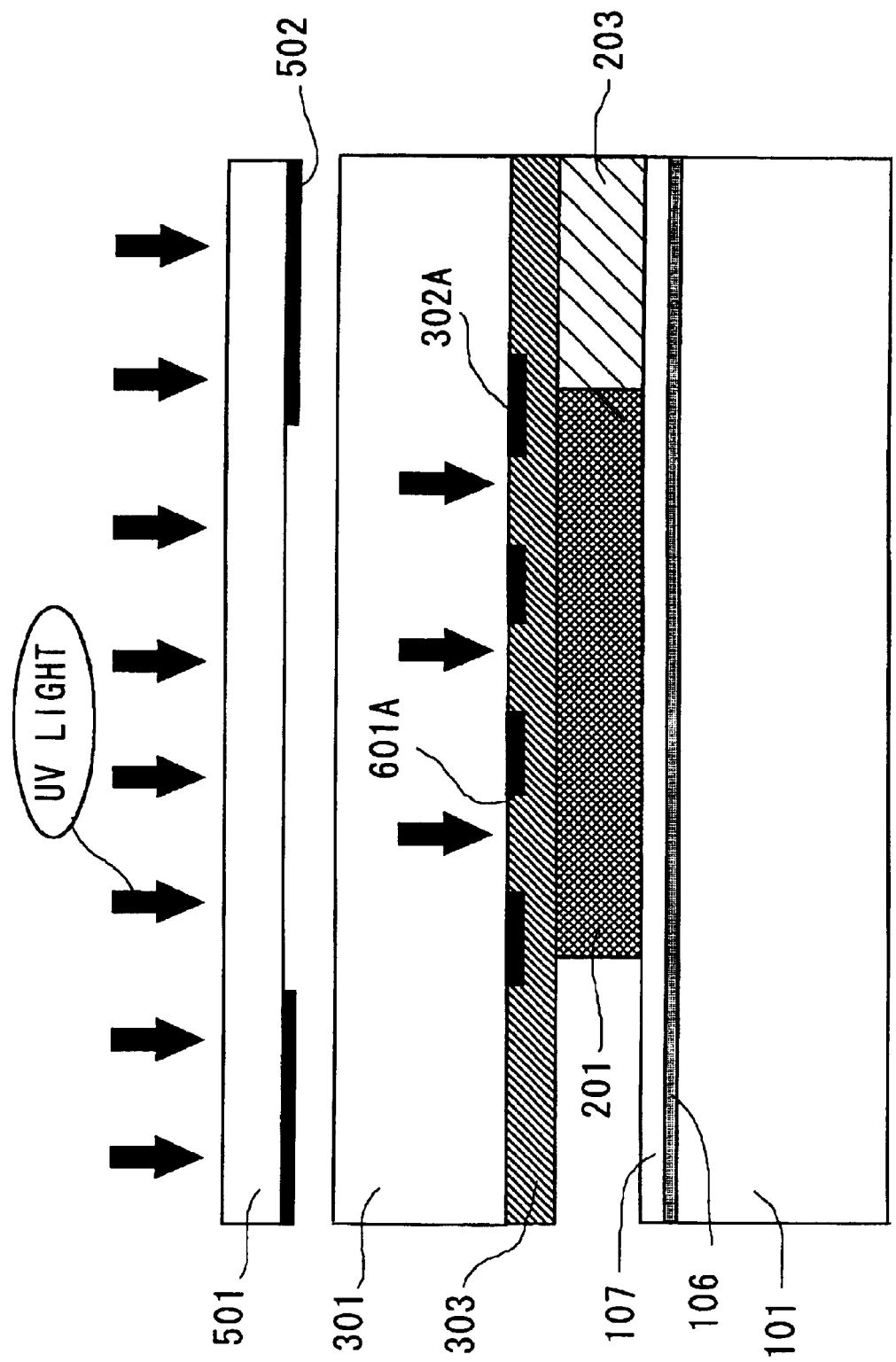

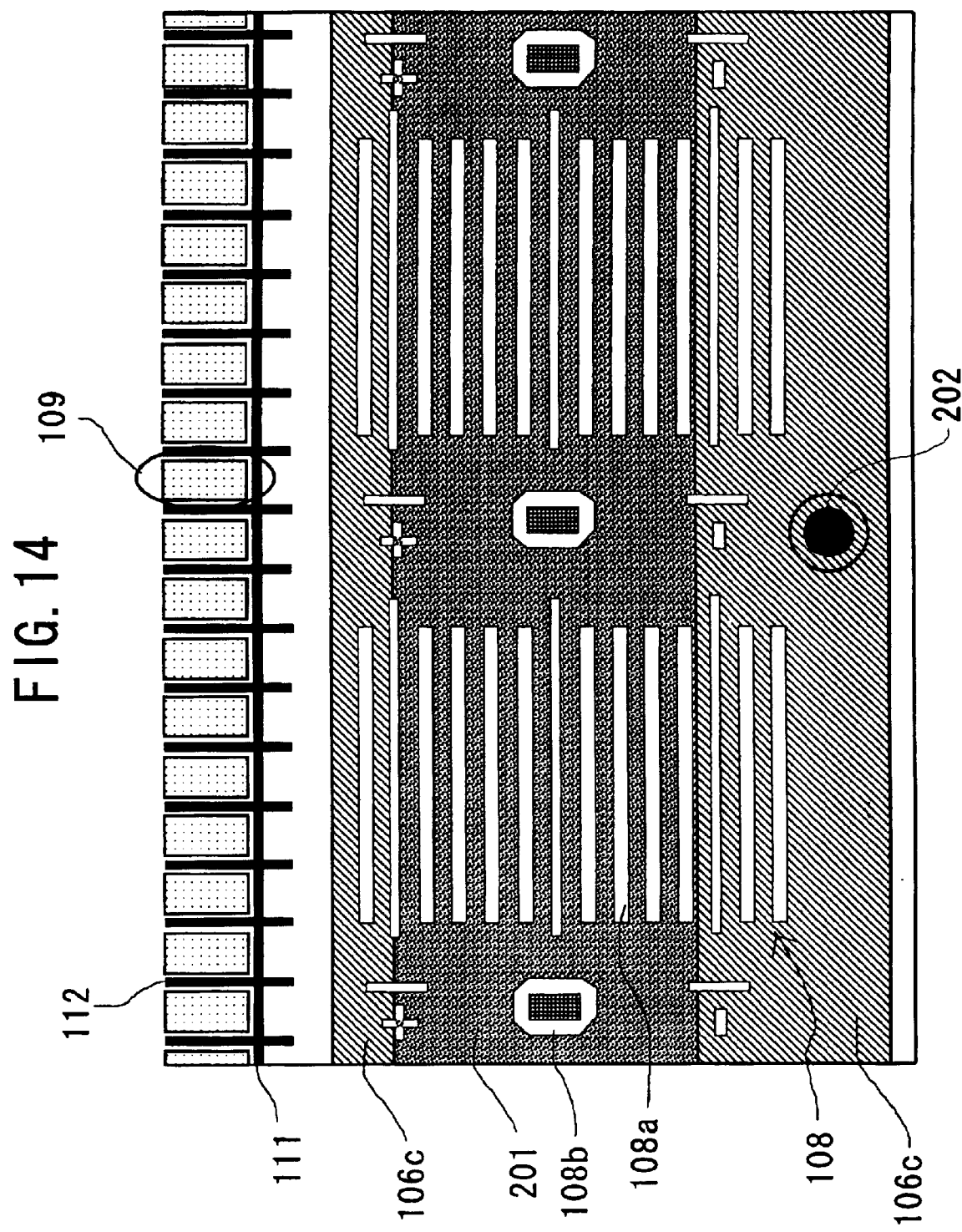

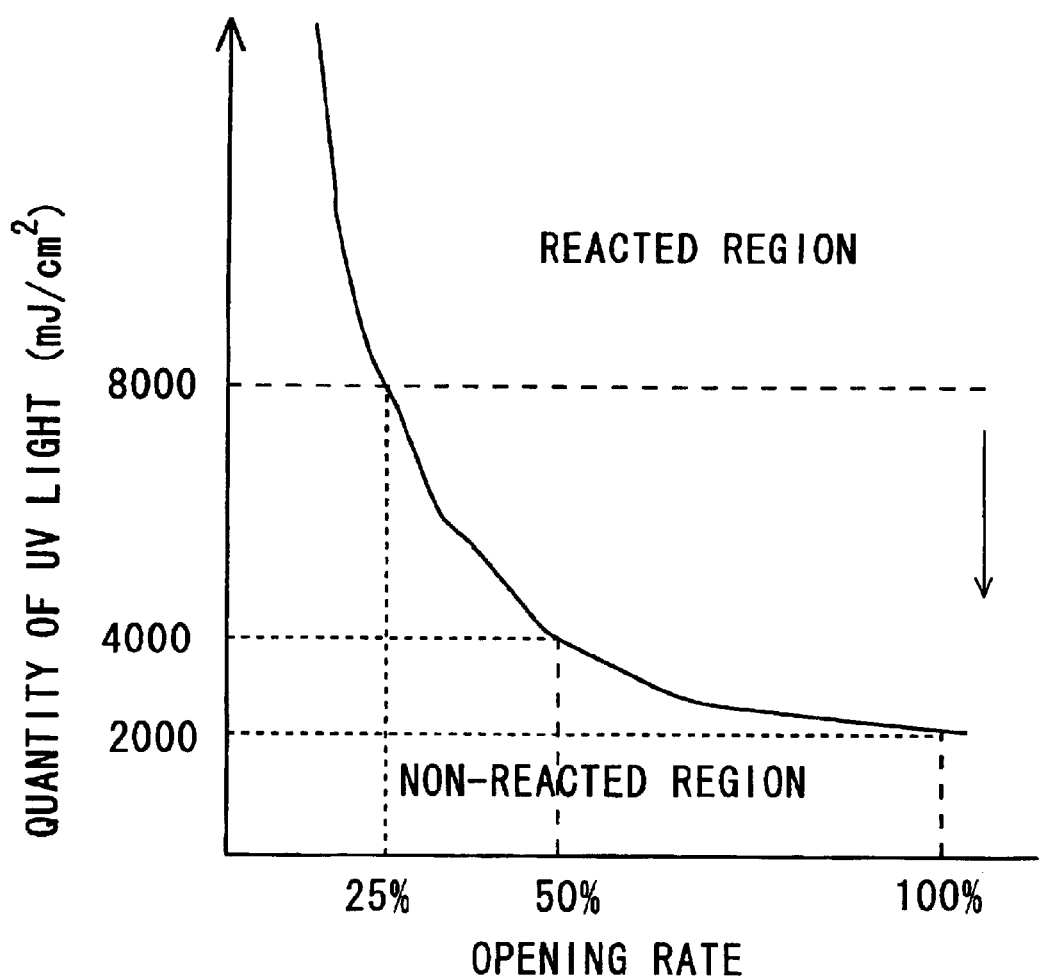

LIQUID-CRYSTAL DISPLAY DEVICE AND METHOD OF FABRICATING SAME

BACKGROUND OF THE INVENTION

1. Field of the Invention

The present invention relates to a Liquid-Crystal Display (LCD) device. More particularly, the invention relates to a LCD device formed by dripping a liquid crystal onto the lower substrate and by coupling it with the upper substrate with a sealing member, and a method of fabricating the device.

2. Description of the Related Art

As the methods of fabricating LCD devices, the "vacuum injection" method and the "dripping and coupling" method have been known so far.

With the "vacuum injection" method, a pair of substrates (i.e., the lower and upper substrates) are coupled together with a sealing member with an injection hole in such a way as to form a gap therebetween. The sealing member is formed by a thermosetting resin. Thereafter, the substrates thus coupled are subjected to heat treatment for curing the member, forming a vacant cell. Then, the inside of the cell is degassed and immersed into a desired liquid crystal. Thus, the liquid crystal is injected into the cell by way of the injection hole due to the pressure difference between the inside and outside of the cell. Finally, the injection hole is closed, resulting in the LCD cell.

On the other hand, with the "dripping and coupling" method, before a pair of substrates (i.e., the lower and upper substrates) are coupled together with a sealing member, a rectangular-frame-shaped sealing member is formed on the lower substrate and a desired liquid crystal is dripped onto the lower substrate inside the sealing member. The sealing member is formed by a ultraviolet (UV)-setting resin. Thereafter, the lower and upper substrates are coupled together with the sealing member and are subjected to UV light irradiation for curing the member, resulting in the LCD cell. The liquid crystal is filled In the cell at this state because it has been dripped onto the lower substrate in advance.

With the "vacuum injection" method, the liquid crystal is injected into the vacant cell due to the pressure difference and therefore, the following problems have occurred with the increasing size of LCD panels.

Specifically, when this method is applied to fabrication of a large-sized LCD panel, (i) the liquid crystal is difficult to reach the positions far away from the injection hole is desired, (ii) it takes a long time to complete the vacuum injection process of the liquid crystal, and (iii) display unevenness is likely to occur in the vicinity of the injection hole.

On the other hand, these problems (i) to (iii) can be solved in the "dripping and coupling" method and thus, this method has ever been used practically for fabricating large-sized LCD panels. However, the inventors found that this method has the following problems or disadvantages.

FIGS. 1 to 3 show the parts of the lower substrate of a typical LCD panel, respectively. FIG. 4 shows the cross-section along the line IV—IV in FIG. 3.

The surface of a lower substrate 1101 is divided into a rectangular display area 1401 located in the middle part, a rectangular-frame-shaped peripheral area 1402 located to surround the area 1401, and a terminal formation area 1403 located outside the area 1402. In the display area 1401, pixels 1109 are arranged in a matrix array. In the peripheral area 1402, a sealing member 1201, gate lines 1103, drain lines 1105, conductive light-blocking members 1106 are formed. In the terminal formation area 1403, gate terminals 1102, drain terminals 1104, and common terminals 1110 are formed.

The gate lines 1103 interconnect the pixels 1109 with the gate terminals 1102. The drain lines 1105 interconnect the pixels 1109 with the drain terminals 1104. The light-blocking members 1106 interconnect the common terminals 1110 with each other. The light-blocking members 1106 have the function of blocking or shielding the external light into the display area 1401 and the function of supplying the common voltage to the common electrode 1303 on the upper substrate 1301, as shown in FIG. 4. The sealing member 1201, which has a shape of rectangular frame, is formed to overlap with the gate and drain lines 1103 and 1105 and the light-blocking members 1106 in the peripheral area 1402.

The lower substrate 1101 is coupled with the upper substrate 1301 with the sealing member 1201 in such a way that a small gap is formed between the substrates 1101 and 1301, as clearly shown in FIG. 4. The liquid crystal layer 1203 is formed in the gap between the substrates 1101 and 1301. A dielectric layer 1107 is formed to cover the surface of the lower substrate 1101.

In the fabrication sequence of the LCD panel, UV light is irradiated to the sealing member 1201 after coupling the substrates 101 and 103, thereby curing the member 1201. In this process, as shown in FIG. 4, a UV exposure mask 1501 with a desired pattern 1502 is placed below the lower substrate 1101 at a specific gap and then, UV light is irradiated upward by way of the mask 1501. The inventors found that the sealing member 1201 does not receive the light as desired in this process, because the UV light is partially blocked by the light-blocking members 1106. Such insufficient irradiation of the UV light to the members 1201 leads to elution of some constituents of the UV-setting resin of the members 1201 into the liquid crystal layer 1203, resulting in defective quality. In particular, this problem will be conspicuous at the location where the light-blocking member 1106 extends along the sealing member 1201 in such a way as to overlap almost entirely with the member 1201, as shown in FIG. 3.

Moreover, the UV light irradiated to the sealing member 1201 is partially blocked by the light-blocking members 1106 and the gate and drain lines 1103 and 1105. Therefore, the irradiation quantity of the UV light to the sealing member 1201 is decreased near the members 1106 and the lines 1103 and 1105. In recent years, the intervals of the lines 1103 and 1105 tend to be narrower with the increasing size and resolution of LCD devices and thus, not only the members 1106 but also the lines 1103 and 1105 will apply more effect to the irradiation quantity. As a result, the irradiation quantity of the UV light to the member 1201 will fluctuate within a wider range from place to place in the near future. This leads to undesired non-uniform curing of the material of the member 1201.

If the light-blocking members 1106 are eliminated, the problem of non-uniform curing of the member 1201 can be almost solved. In this case, however, the common voltage is unable to be supplied to the opposite common electrode 1303 on the upper substrate 1301 and at the same time, external light is likely to enter the display area 1401 to thereby cause defective displaying operation. Thus elimination of the members 1106 is not realistic.

SUMMARY OF THE INVENTION

Accordingly, an object of the present invention is to provide a LCD device that allows the material of the sealing member to receive curing light sufficiently to thereby realize its approximately uniform curing without eliminating the light-blocking members, and a method of fabricating the device.

Another object of the present invention is to provide a LCD device that improves the display characteristic, and a method of fabricating the device.

Still another object of the present invention is to provide a LCD device that ensures the uniformity of the cell gap between the lower and upper substrates, and a method of fabricating the device.

The above objects together with others not specifically mentioned will become clear to those skilled in the art from the following description.

According to the first aspect of the invention, a LCD device is provided. The device comprises:
(a) a first substrate having a display area and a peripheral area located to surround the display area;
the peripheral area including a sealing member, wiring lines extended from the display area, and conductive light-blocking members;
(b) a second substrate coupled with the first substrate; and
(c) a liquid crystal layer formed between the first substrate and the second substrate;
the liquid crystal layer being defined by the first substrate, the second substrate, and the sealing member;
wherein the sealing member is formed to overlap with the wiring lines and the light-blocking members in such a way that a non-overlapping area of the sealing member with the wiring lines and the light-blocking members is equal to 25% per unit area of the sealing member or greater.

With the LCD device according to the first aspect of the invention, the sealing member is formed to overlap with the wiring lines and the light-blocking members in such a way that the non-overlapping area of the sealing member with the wiring lines and the light-blocking members is equal to 25% per unit area of the sealing member or greater. Therefore, the sealing member can receive the curing light sufficiently to thereby realize approximately uniform curing of the material of the sealing member, even if the light-blocking members are not eliminated. As a result, the display characteristics are improved.

In a preferred embodiment of the device according to the first aspect of the invention, the sealing member has non-overlapping regions with the wiring lines and the light-blocking members. The non-overlapping regions are apart from each other at intervals of 80 μm or less.

In another preferred embodiment of the device according to the first aspect of the invention, one of the light-blocking members is located near one corner of the display area and has penetrating holes at a location that overlaps with the sealing member. The holes are arranged along the sealing member.

In still another preferred embodiment of the device according to the first aspect of the invention, one of the light-blocking members is located between a set of the wiring lines and another set thereof and has penetrating holes at a location that overlaps with the sealing member. The holes are arranged along the sealing member.

In a further preferred embodiment of the device according to the first aspect of the invention, one of the light-blocking members is elongated along the sealing member and has penetrating holes at a location that overlaps with the sealing member. The holes are arranged along the sealing member.

In a still further preferred embodiment of the device according to the first aspect of the invention, the wiring lines are extended outwardly from the display area in such a way as to overlap with the sealing member. A first set of the wiring lines has a first width and is arranged at a first pitch. A second set of the wiring lines has a second width greater than the first width and is arranged at a second pitch greater than the first pitch.

In a still further preferred embodiment of the device according to the first aspect of the invention, an opposite light-blocking member is formed on the second substrate. The opposite light-blocking member has penetrating holes at a location that overlaps with the sealing member.

In a still further preferred embodiment of the device according to the first aspect of the invention, the penetrating holes of at least one of the light-blocking members are formed to define a vernier.

According to the second aspect of the invention, a method of fabricating a LCD device is provided. The method comprises the steps of:
(a) forming a first substrate with a display area and a peripheral area located to surround the display area;
the peripheral area including wiring lines extended from the display area, and conductive light-blocking members;
(b) forming a sealing member in the peripheral area of the first substrate;
(c) dripping a liquid crystal on the first substrate within an area surrounded by the sealing member;
(d) coupling a second substrate with the first substrate in such a way as to confine the liquid crystal in a space defined by the first substrate, the second substrate, and the sealing member; and
(e) curing the sealing member by irradiating specific light to the sealing member;
wherein the sealing member is formed to overlap with the wiring lines and the light-blocking members in such a way that a non-overlapping area of the sealing member with the wiring lines and the light-blocking members is equal to 25% per unit area of the sealing member or greater.

With the method of fabricating a LCD device according to the second aspect of the invention, it is obvious that the LCD device of the first aspect of the invention is fabricated.

In a preferred embodiment of the method according to the second aspect of the invention, the light-blocking members have penetrating holes arranged at locations that overlap with he sealing member. The light for curing the sealing member is irradiated to the sealing member by way of the first substrate.

In another preferred embodiment of the method according to the second aspect of the invention, the second substrate includes an opposite light-blocking member with penetrating holes at a location that overlaps with the sealing member. The light for curing the sealing member is irradiated to the sealing member by way of the second substrate.

According to the third aspect of the invention, another LCD device is provided The device comprises:
(a) a first substrate having a display area and a peripheral area located to surround the display area;
the peripheral area including a sealing member, wiring lines extended from the display area, and conductive light-blocking members;
(b) a second substrate coupled with the first substrate; and
(c) a liquid crystal layer formed between the first substrate and the second substrate;
the liquid crystal layer being defined by the first substrate, the second substrate, and the sealing member;
wherein the sealing member is formed to overlap with the wiring lines and the light-blocking members in such a way that non-overlapping regions of the sealing member with the wiring lines and the light-blocking members are arranged regularly;

and wherein the non-overlapping regions are apart from each other at intervals of 80 μm or less.

With the LCD device according to the third aspect of the invention, the sealing member is formed to overlap with the wiring lines and the light-blocking members in such a way that non-overlapping regions of the sealing member with the wiring lines and the light-blocking members are arranged regularly. Therefore, the cell gap non-uniformity is prevented or suppressed effectively.

Moreover, since the non-overlapping regions are apart from each other at intervals of 80 μm or less, light for curing the sealing member is sufficiently irradiated to the sealing member. Thus, the defective display operation caused by the elution of the constituent of the sealing member is prevented.

According to the fourth aspect of the invention, still another LCD device is provided. The device comprises:
(a) a first substrate having a display area and a peripheral area located to surround the display area;
the, peripheral area including a sealing member, and conductive light-blocking members;
(b) a second substrate coupled with the first substrate; and
(c) a liquid crystal layer formed between the first substrate and the second substrate;
the liquid crystal layer being defined by the first substrate, the second substrate, and the sealing member;
wherein the sealing member is formed to overlap with the light-blocking members in such a way that the light-blocking members have penetrating holes arranged regularly at locations that overlap with the sealing member;
and wherein the holes are apart from each other at intervals of 80 μm or less.

With the LCD device according to the fourth aspect of the invention, the sealing member is formed to overlap with the light-blocking members in such a way that the light-blocking members have penetrating holes arranged regularly at locations that overlap with the sealing member. Therefore, the cell gap non-uniformity is prevented or suppressed effectively.

Moreover, since the holes are apart from each other at intervals of 80 μm or less, light for curing the sealing member is sufficiently irradiated to the sealing member. Thus, the defective display operation caused by the elution of the constituent of the sealing member is prevented.

In a preferred embodiment of the device according to the third or fourth aspect of the invention, an opposite light-blocking member is formed on the second substrate. The opposite light-blocking member has non-overlapping regions with the sealing member. The non-overlapping regions are arranged regularly.

In another preferred embodiment of the device according to the third or fourth aspect of the invention, an opposite light-blocking member is formed on the second substrate. The opposite light-blocking member covers the whole sealing member.

In still another preferred embodiment of the device according to the third or fourth aspect of the invention, an opposite light-blocking member is formed on the second substrate. The opposite light-blocking member does not cover the whole sealing member.

In a further preferred embodiment of the device according to the third or fourth aspect of the invention, an opposite light-blocking member is formed on the second substrate in such a way as to be overlapped with the sealing member. The light-blocking member is protruded into an overlapping region of the second substrate with the sealing member by a specific width X. The width X satisfies a relationship of $a \leq X \leq 2a$, where a is a cell gap between the first and second substrates.

According to the fifth aspect of the invention, still another LCD device is provided. The device comprises:
(a) a first substrate having a display area and a peripheral area located to surround the display area;
the peripheral area including a sealing member;
(b) a second substrate coupled with the first substrate;
the second substrate including an opposite conductive light-blocking member; and
(c) a liquid crystal layer formed between the first substrate and the second substrate;
the liquid crystal layer being defined by the first substrate, the second substrate, and the sealing member;
wherein the sealing member is formed to overlap with the opposite light-blocking member in such a way that non-overlapping regions of the sealing member with the opposite light-blocking member are arranged regularly;
and wherein the non-overlapping regions are apart from each other at intervals of 80 μm or less.

With the LCD device according to the fifth aspect of the invention, the sealing member is formed to overlap with the opposite light-blocking member on the second substrate in such a way that non-overlapping regions of the sealing member with the opposite light-blocking member are arranged regularly. Therefore, the cell gap non-uniformity is prevented or suppressed effectively Moreover, since the non-overlapping regions are apart from each other at intervals of 80 μm or less, light for curing the sealing member is sufficiently irradiated to the sealing member. Thus, the defective display operation caused by the elution of the constituent of the sealing member is prevented.

According to the sixth aspect of the invention, a further LCD device is provided. The device comprises:
(a) a first substrate having a display area and a peripheral area located to surround the display area;
the peripheral area including a sealing member;
(b) a second substrate coupled with the first substrate;
the second substrate including an opposite conductive light-blocking member; and
(c) a liquid crystal layer formed between the first substrate and the second substrate;
the liquid crystal layer being defined by the first substrate, the second substrate, and the sealing member;
wherein the sealing member is formed to overlap with the opposite light-blocking member in such a way that penetrating holes are arranged regularly in overlapping regions of the opposite light-blocking member with the sealing member;
and wherein the holes are apart from each other at intervals of 80 μm or less.

With the LCD device according to the sixth aspect of the invention, the sealing member is formed to overlap with the opposite light-blocking member on the second substrate in such a way that penetrating holes are arranged regularly in overlapping regions of the opposite light-blocking member with the sealing member. Therefore, the cell gap non-uniformity is prevented or suppressed effectively.

Moreover, since the holes are apart from each other at intervals of 80 μm or less, light for curing the sealing member is sufficiently irradiated to the sealing member. Thus, the detective display operation caused by the elution of the constituent of the sealing member is prevented.

In a preferred embodiment of the device according to the fifth or sixth aspect of the invention, the first substrate includes wiring lines extended from the display area and light-blocking members. The wiring lines and the light-blocking members are overlapped with the sealing member.

Non-overlapping regions of the sealing member with the wiring lines and the light-blocking members are arranged regularly.

In another preferred embodiment of the device according to the fifth or sixth aspect of the invention, the opposite light-blocking member is made of an organic material.

According to the seventh aspect of the invention, a further LCD device is provided. The device comprises:
(a) a first substrate having a display area and a peripheral area located to surround the display area;
the peripheral area including a sealing member;
(b) a second substrate coupled with the first substrate;
the second substrate including an opposite conductive light-blocking member; and
(c) a liquid crystal layer formed between the first substrate and the second substrate;
the liquid crystal layer being defined by the first substrate, the second substrate, and the sealing member;
wherein the opposite light-blocking member is not located in an overlapping region of the second substrate with the sealing member.

With the LCD device according to the seventh aspect of the invention, the opposite light-blocking member on the second substrate is not located in an overlapping region of the second substrate with the sealing member. Therefore, the cell gap non-uniformity is prevented or suppressed effectively.

According to the eighth aspect of the invention, a further LCD device is provided. The device comprises:
(a) a first substrate having a display area and a peripheral area located to surround the display area;
the peripheral area including a sealing member;
(b) a second substrate coupled with the first substrate;
the second substrate including an opposite conductive light-blocking member; and
(c) a liquid crystal layer formed between the first substrate and the second substrate;
the liquid crystal layer being defined by the first substrate, the second substrate, and the sealing member;
wherein the opposite light-blocking member is protruded into an overlapping region of the second substrate with the sealing member by a specific width X;
and wherein the width X satisfies a relationship of $a \leq X \leq 2a$, where a is a cell gap between the first and second substrates:

With the LCD device according to the eighth aspect of the invention, the opposite light-blocking member an the second substrate is protruded into the overlapping region of the second substrate with the sealing member by the specific width X, where $a \leq X \leq 2a$. Therefore, not only the cell gap non-uniformity but also the external light leakage are prevented or suppressed effectively.

In a preferred embodiment of the device according to the seventh or eighth aspect of the inventions the opposite light-blocking member is made of an organic material.

In a preferred embodiment of the device according to one of the third to eighth aspects of the invention, an organic layer is formed on the first substrate in such a way as not to overlap with the sealing member.

In another preferred embodiment of the device according to one of the third to eighth aspects of the invention, the device is of the lateral electric-field type.

According to the ninth aspect of the invention, a method of fabricating a LCD device is provided. The method comprises the steps of:
(a) forming a first substrate with a display area and a peripheral area located to surround the display area;
the peripheral area including wiring lines extended from the display area, and conductive light-blocking members.
(b) forming a sealing member in the peripheral area of the first substrate;
(c) dripping a liquid crystal on the first substrate within an area surrounded by the sealing member;
(d) coupling a second substrate with the first substrate in such a way as to confine the liquid crystal in a space defined by the first substrate, the second substrate, and the sealing member; and
(e) curing the sealing member by irradiating specific light to the sealing member;
wherein the sealing member is formed to overlap with the wiring lines and the light-blocking members in such a way that non-overlapping regions of the sealing member with the wiring lines and the light-blocking members are arranged regularly;
and wherein the non-overlapping regions are apart from each other at intervals of 80 µm or less.

With the method of fabricating a LCD device according to the ninth aspect of the invention, it is obvious that the LCD device of the third aspect of the invention is fabricated.

In a preferred embodiment of the method according to the ninth aspect of the invention, the light-blocking members have penetrating holes arranged at locations that overlap with the sealing member. The light for curing the sealing member is irradiated to the sealing member by way of the first substrate.

According to the tenth aspect of the invention, still another method of fabricating a LCD device is provided. The method comprises the steps of:
(a) forming a first substrate with a display area and a peripheral area located to surround the display area;
(b) forming a sealing,member in the peripheral area of the first substrate,
(c) dripping a liquid crystal on the first substrate within an area surrounded by the sealing member;
(d) forming an opposite conductive light-blocking member on the second substrate;
(e) coupling a second substrate with the first substrate in such a way as to confine the liquid crystal in a space defined by the first substrate, the second substrate, and the sealing member; and
(e) curing the sealing member by irradiating specific light to the sealing member;
wherein the sealing member is formed to overlap with the opposite light-blocking member in such a way that non-overlapping regions of the opposite light-blocking member with the sealing member are arranged regularly;
and wherein the non-overlapping regions are apart from each other at intervals of 80 µm or less.

With the method of fabricating a LCD device according to the tenth aspect of the invention, it is obvious that the LCD device of the fifth aspect of the invention is fabricated.

In a preferred embodiment of the method according to the tenth aspect of the invention, the opposite light-blocking member has penetrating holes arranged at locations that overlap with the sealing member. The light for curing the scaling member is irradiated to the sealing member by way of the second substrate.

According to the eleventh aspect of the invention, a further method of fabricating a LCD device is provided. The method comprises the steps of:
(a) forming a first substrate with a display area and a peripheral area located to surround the display area;
(b) forming a sealing member in the peripheral area of the first substrate;
(c) dripping a liquid crystal on the first substrate within an area surrounded by the sealing member;

(d) forming an opposite conductive light-blocking member on the second substrate;

(e) coupling a second substrate with the first substrate in such a way as to confine the liquid crystal in a space defined by the first substrate, the second substrate, and the sealing member; and (e) curing the sealing member by irradiating specific light to the sealing member;

wherein the sealing member is formed not to overlap with the opposite light-blocking member;

and wherein the light is irradiated to the sealing member by way of the second substrate.

With the method of fabricating a LCD device according to the eleventh tenth aspect of the invention, it is obvious that the LCD device of the seventh aspect of the invention is fabricated.

BRIEF DESCRIPTION OF THE DRAWINGS

In order that the present invention may be readily carried into effect, it will now be described with reference to the accompanying drawings.

FIG. 12 is a schematic cross-sectional view along the line XII—XII in FIG. 9.

FIG. 13 is a schematic cross-sectional view along the line XII—XII in FIG. 9, which shows a LCD device according to a second embodiment of the invention.

FIG. 14 is a schematic cross-sectional view along the line XII—XII in FIG. 9, which shows a LCD device according to a third embodiment of the invention.

FIG. 15 is a graph showing the relationship between the opening rate of the penetrating holes with the quantity of the UV light in the LCD device according to the invention.

DETAILED DESCRIPTION OF THE PREFERRED EMBODIMENTS

Figure 1:
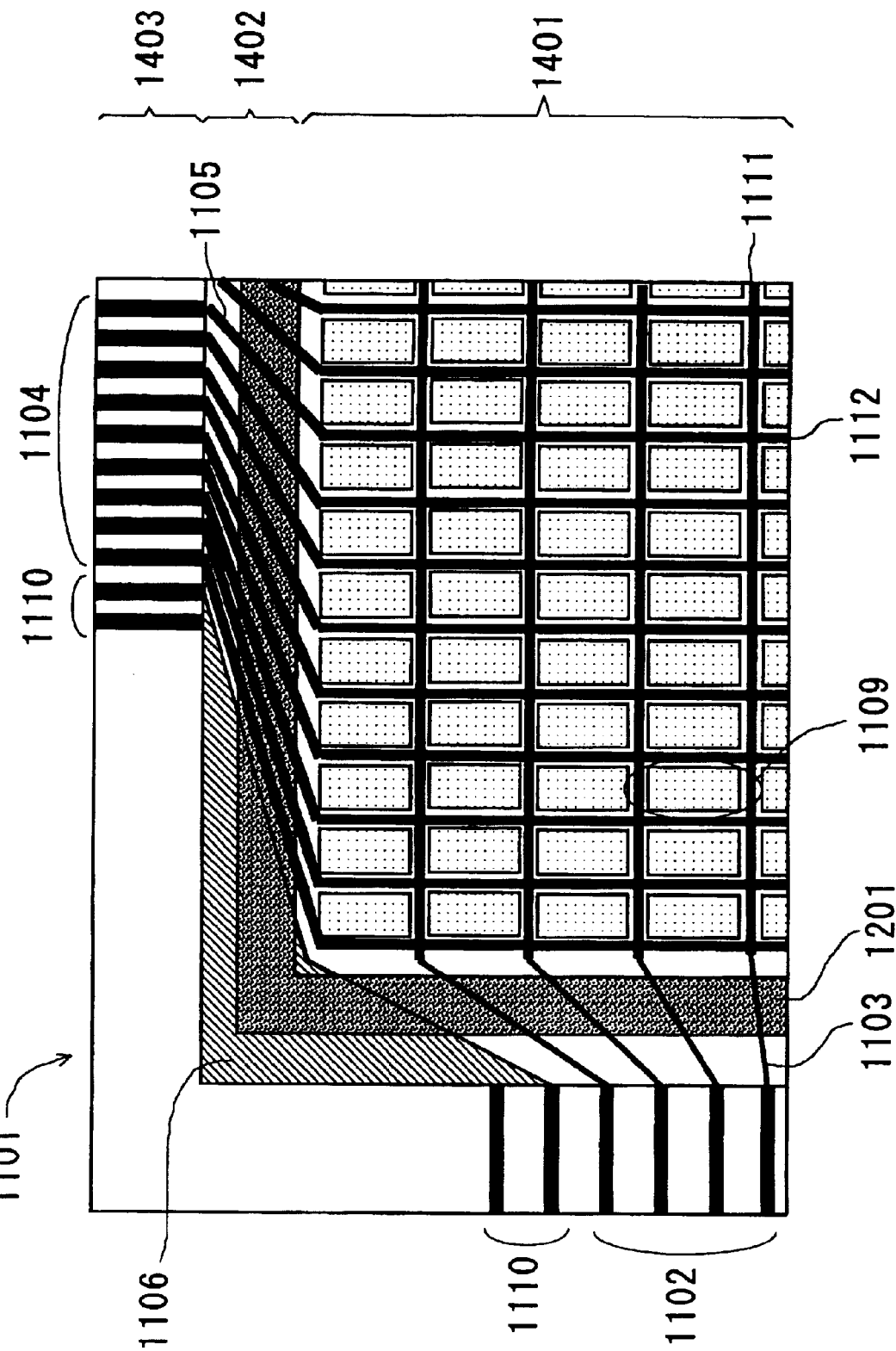
FIG. 1 is a schematic, partial plan view showing the part of the lower substrate of a prior-art LCD device, which shows the structure at the part corresponding to the part a in FIG. 5.
Figure 2:
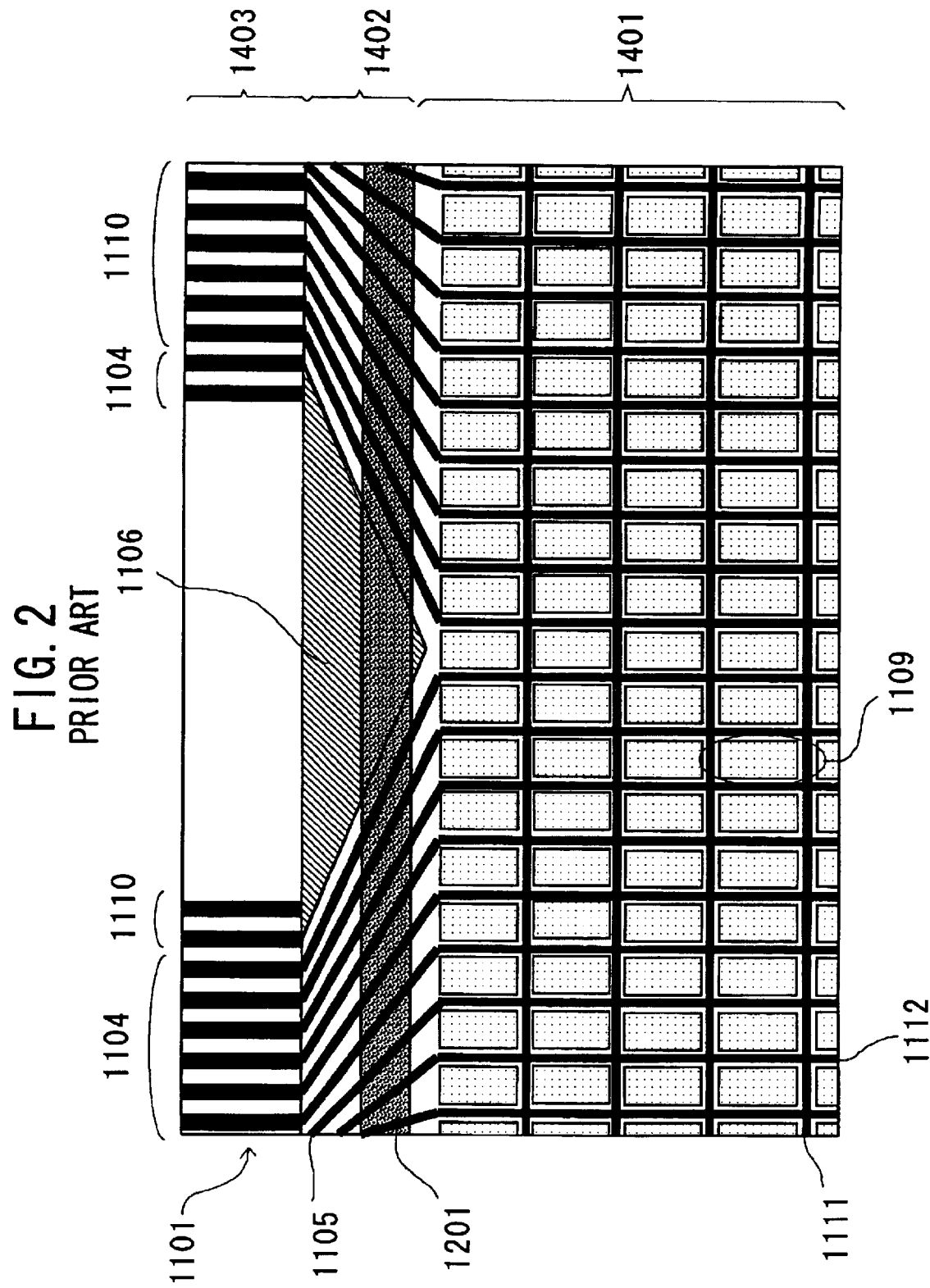
FIG. 2 is a schematic, partial plan view showing the part of the lower substrate of the prior-art LCD device of FIG. 1, which shows the structure at the part corresponding to the part b in FIG. 5.
Figure 3:
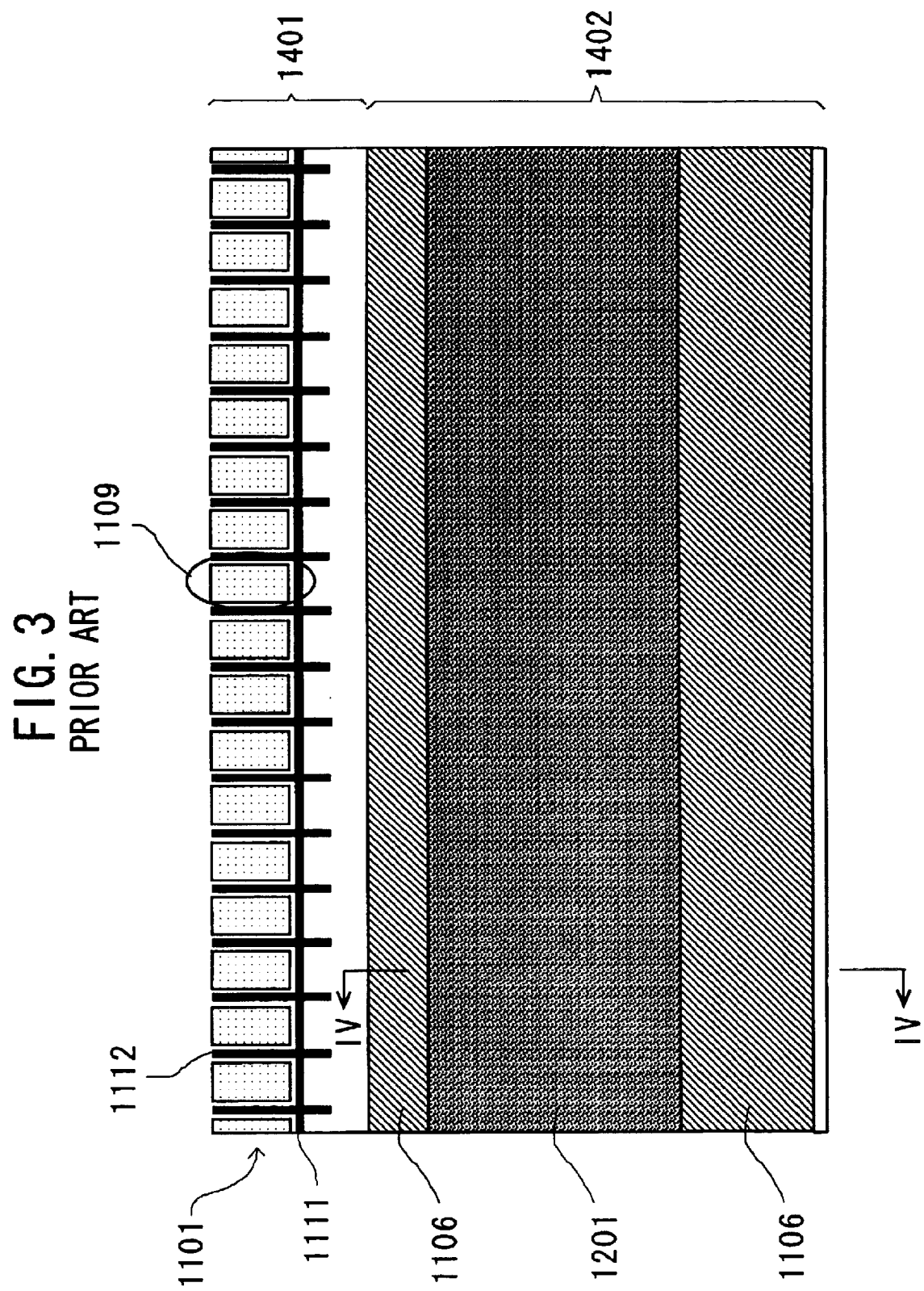
FIG. 3 is a schematic, partial plan view showing the part of the lower substrate of the prior-art LCD device of FIG. 1, which shows the structure at the part corresponding to the part c in FIG. 5.
Figure 4:
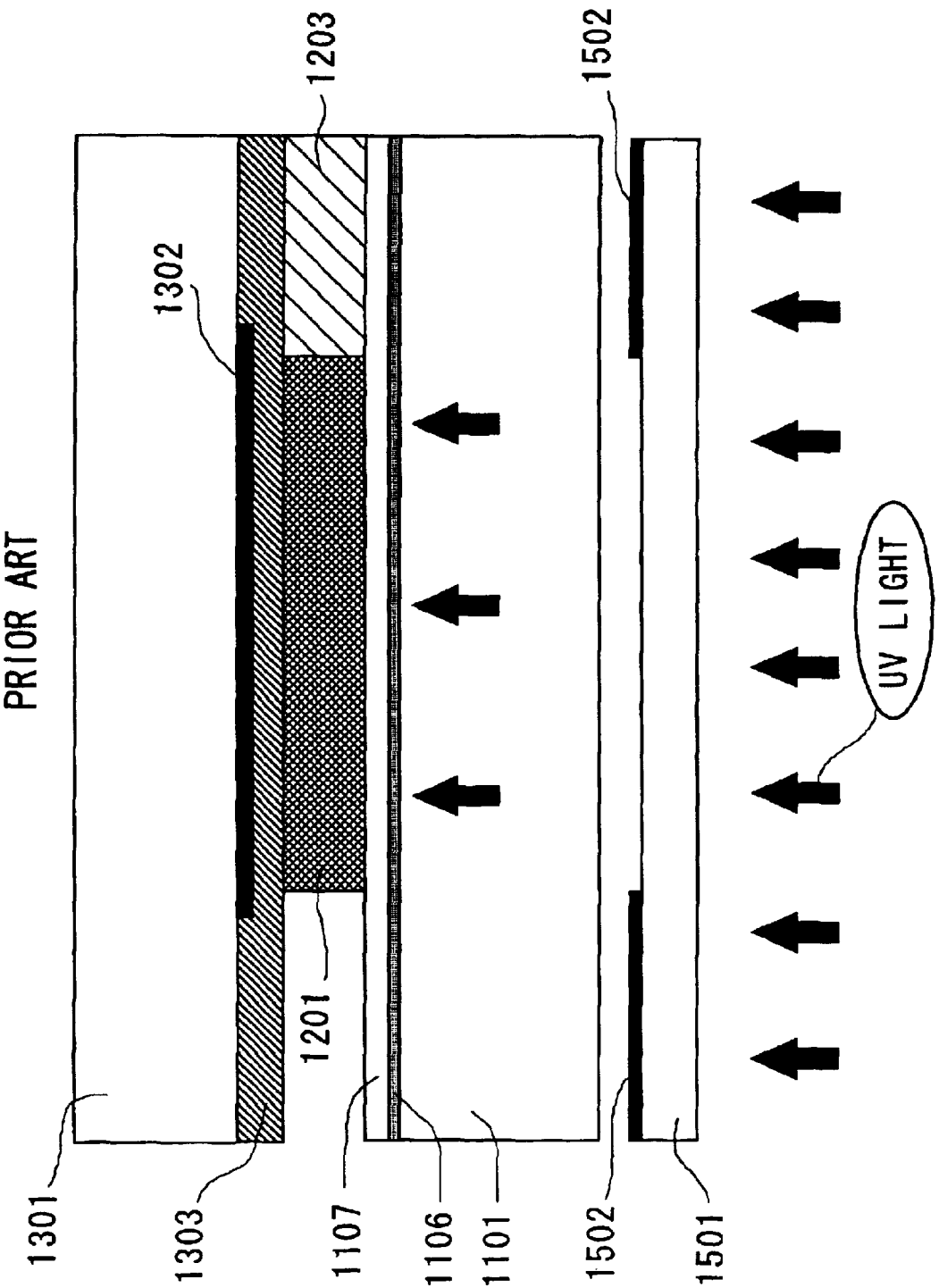
FIG. 4 is a schematic cross-sectional view along the line IV—IV in FIG. 3.

Preferred embodiments of the present invention will be described in detail below while referring to the drawings attached.

First Embodiment

A LCD device according to a first embodiment of the invention is explained below with reference to FIGS. 1 to 8, in which the invention is applied to a LCD device of the Twisted Nematic (TN) type.

Figure 5:
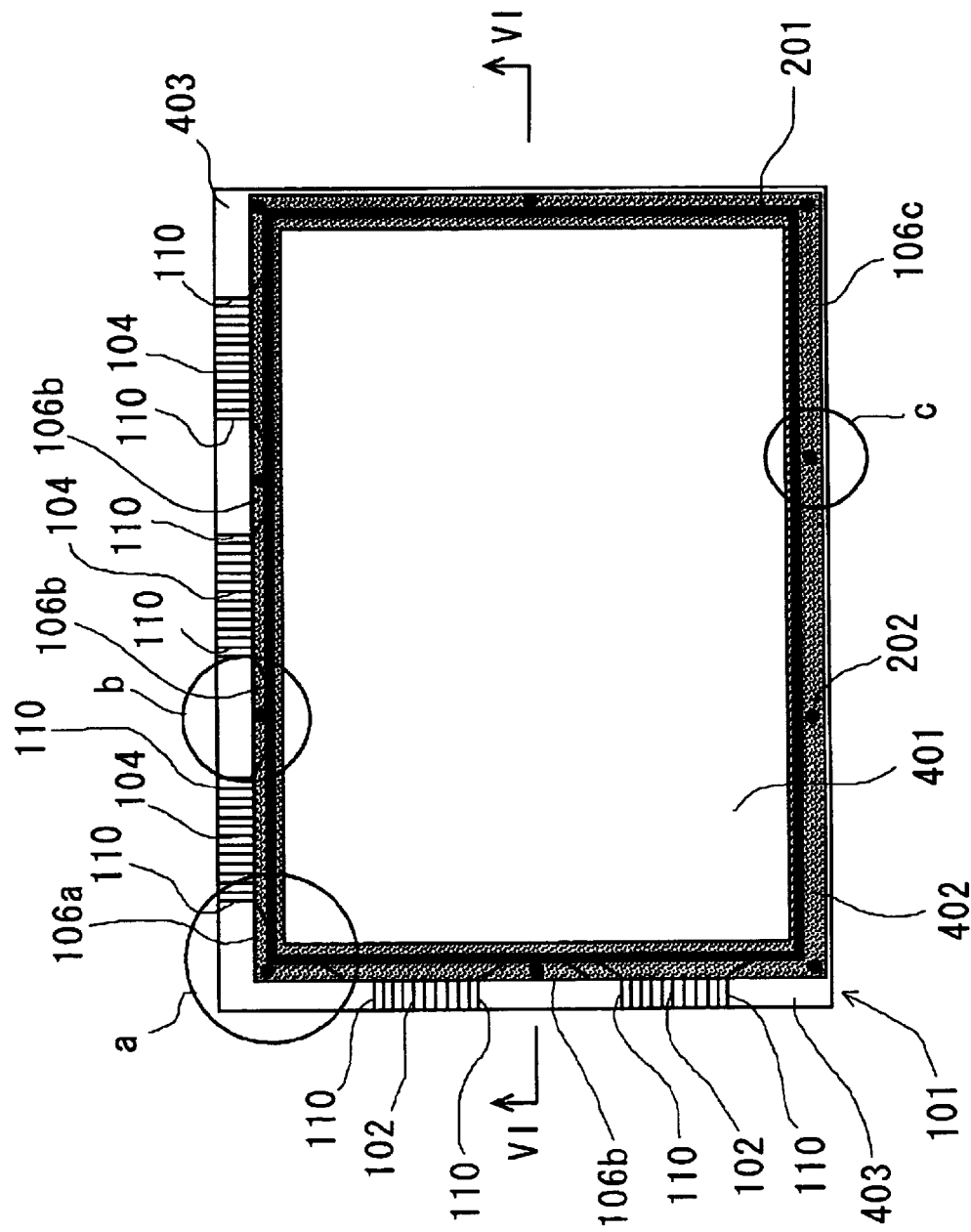
FIG. 5 is a schematic plan view showing the lower substrate of a LCD device according to a first embodiment of the invention, in which the pixels arranged in the display area are omitted for simplification.
Figure 6:
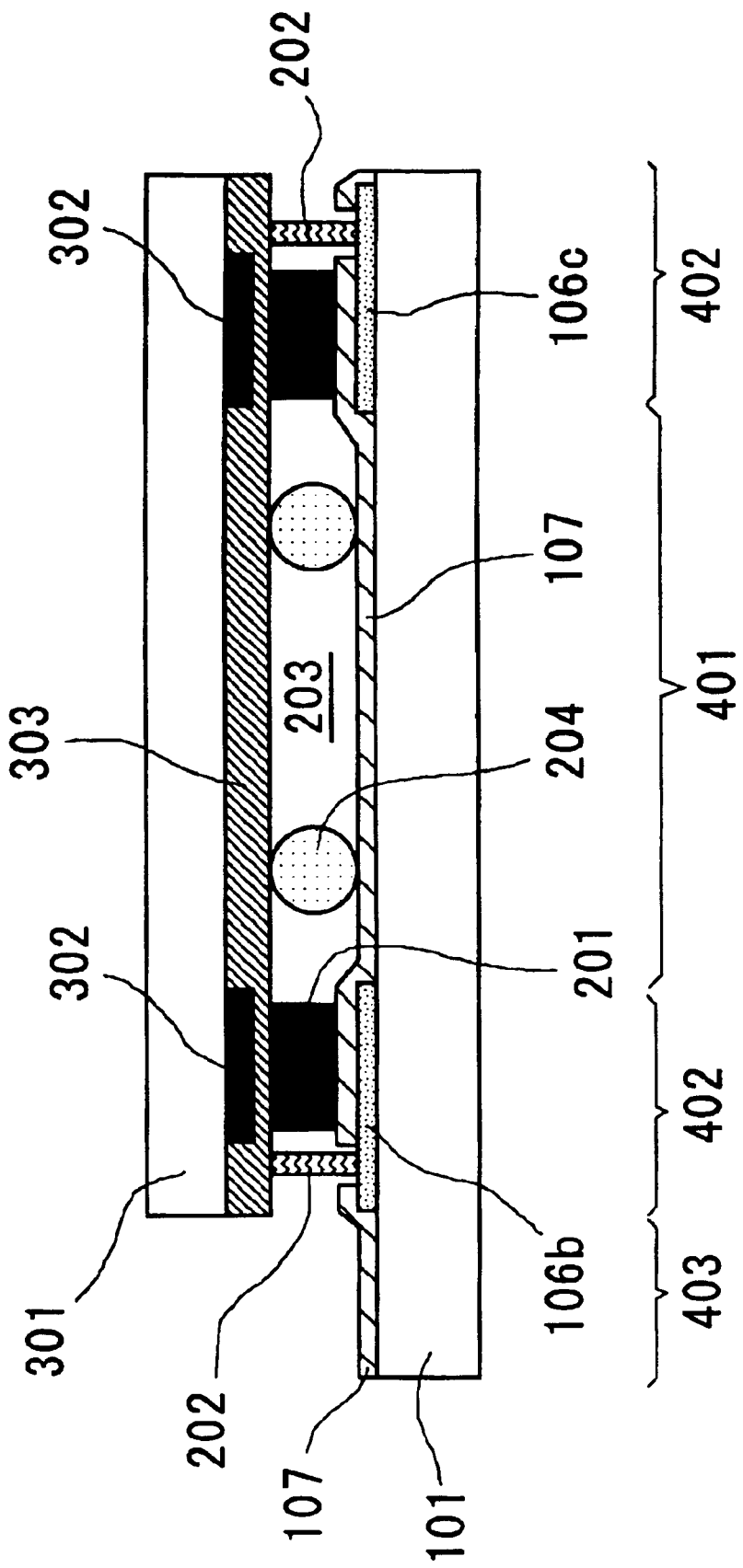
FIG. 6 is a schematic cross-sectional view showing the configuration of the LCD device according to the first embodiment of FIG. 5, which is along the line VI—VI in FIG. 5.

As shown in FIGS. 5 and 6, the LCD panel of the LCD device according to the first embodiment comprises a rectangular lower substrate 101, a rectangular upper substrate 301, and a liquid crystal layer 203 sandwiched by the substrates 101 and 301. The lower substrate 101 is coupled with the upper substrate 301 with the sealing member 201 in such a way that a small gap is formed between the substrates 101 and 301, as shown in FIG. 6. Liquid crystal is filled into the gap and confined by the member 201, forming the liquid crystal layer 203.

The surface of the lower substrate 101 is divided into a rectangular display area 401 located in the middle part, a rectangular-frame-shaped peripheral area 402 located in the periphery of the substrate 101 to surround the area 401, and a rectangular-frame-shaped terminal formation area 403 located outside the area 402. The sealing member 201 is located in the peripheral area 402.

Figure 7:
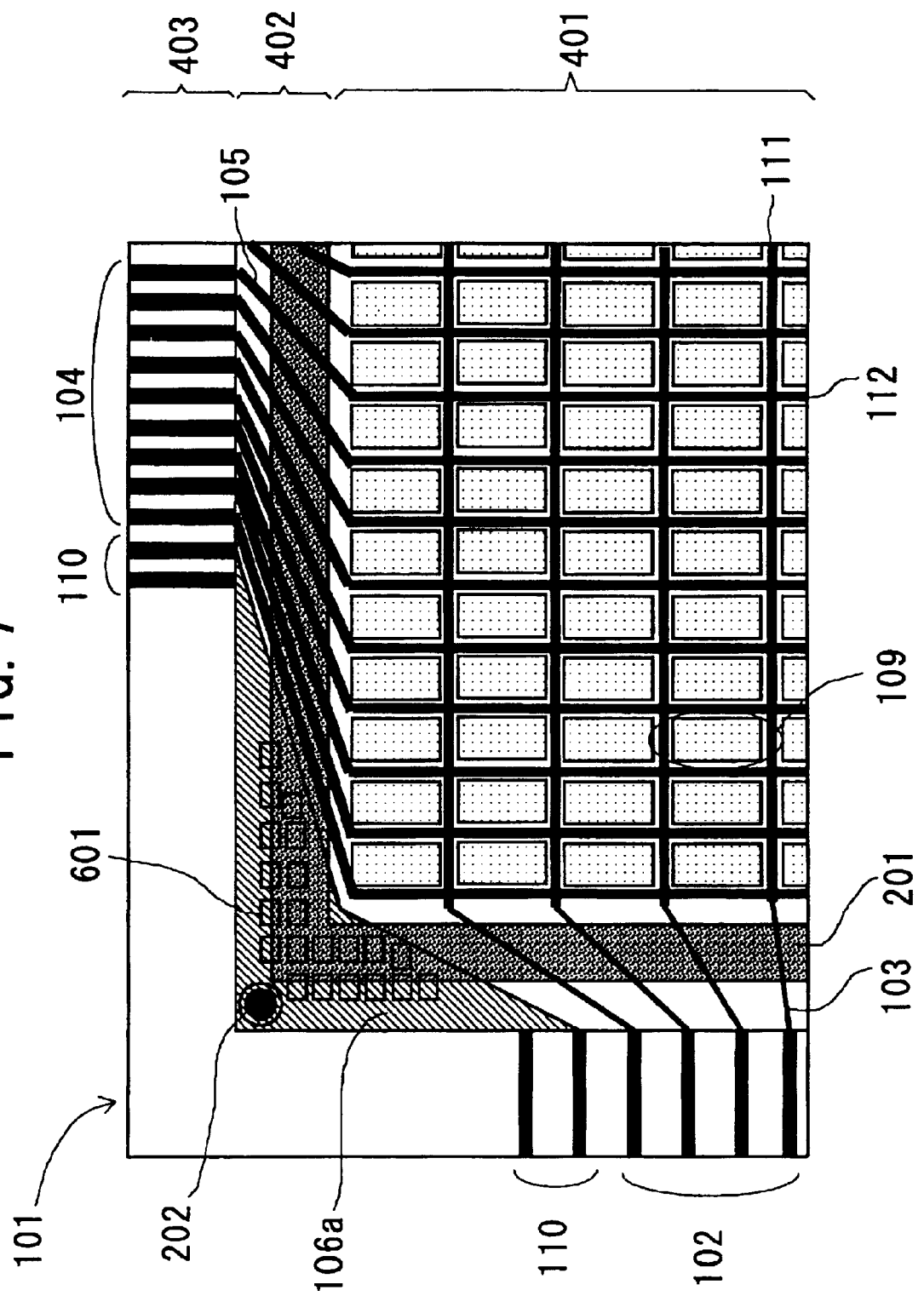
FIG. 7 is a schematic, partial, enlarged plan view showing the part a of the lower substrate of the LCD device according to the first embodiment of FIG. 5.
Figure 8:
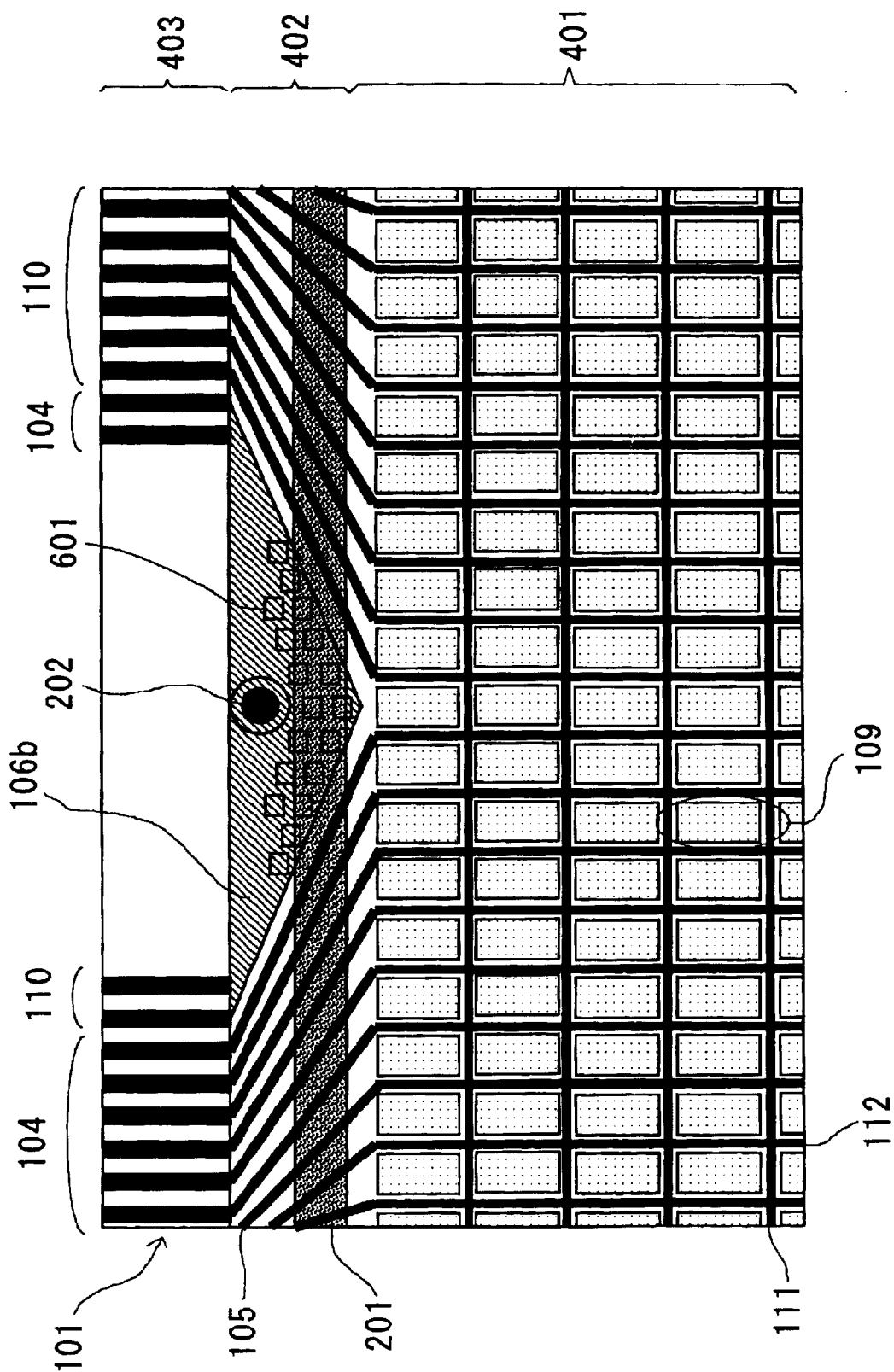
FIG. 8 is a schematic, partial, enlarged plan view showing the part b of the lower substrate of the LCD device according to the first embodiment of FIG. 5.
Figure 9:
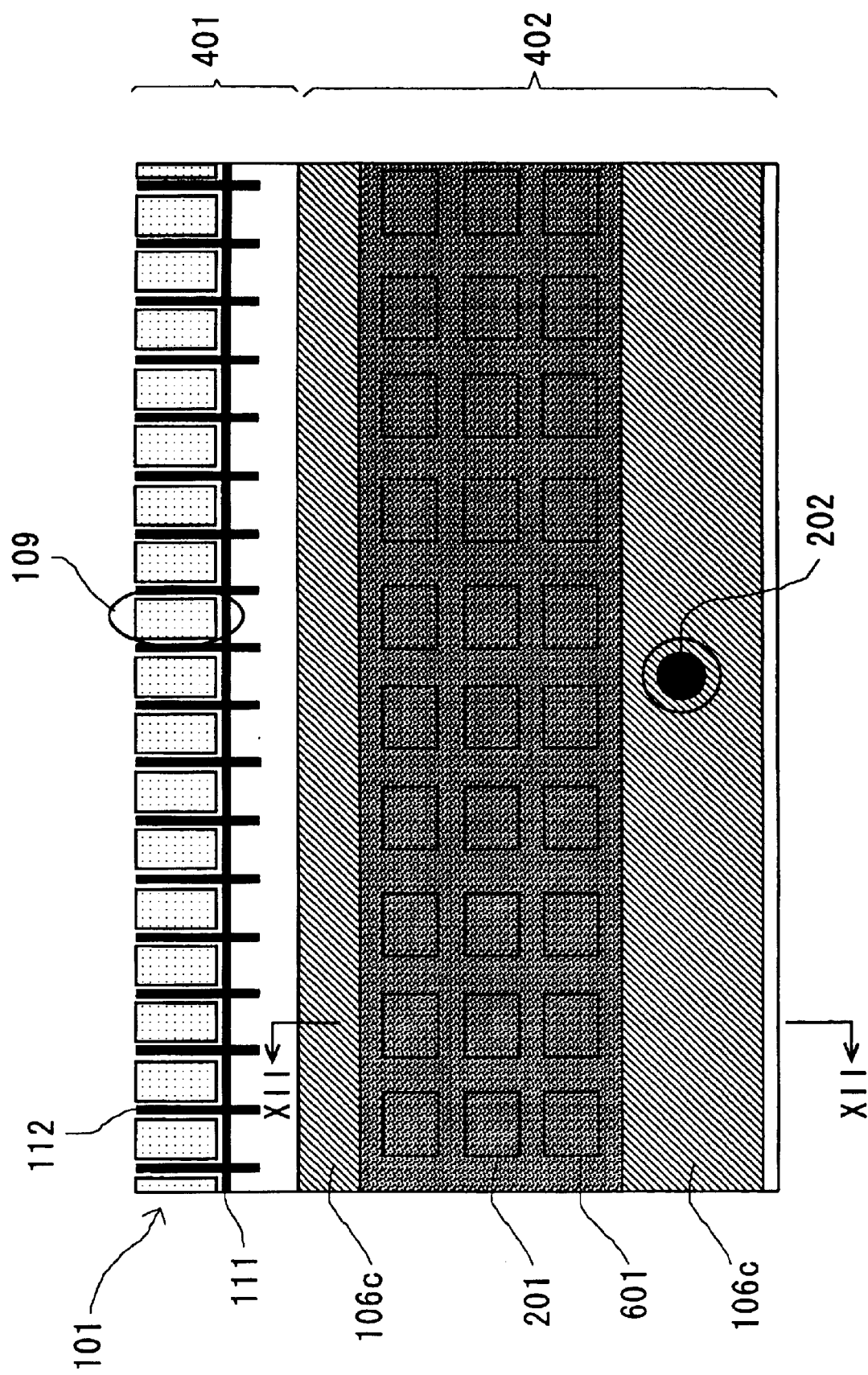
FIG. 9 is a schematic, partial, enlarged plan view showing the part c of the lower substrate of the LCD device according to the first embodiment of FIG. 5.

In the display area 401, as shown in FIGS. 7 to 9, pixels 109 are arranged in a matrix array. Scan lines 111 are formed to extend along the longitudinal axis (along the horizontal direction in FIGS. 7 to 9) of the lower substrate 101 at a specific pitch. Signal lines 112 are formed to extend perpendicular to the longitudinal axis (along the vertical direction in FIGS. 7 to 9) of the lower substrate 101 at a specific pitch.

Figure 10:
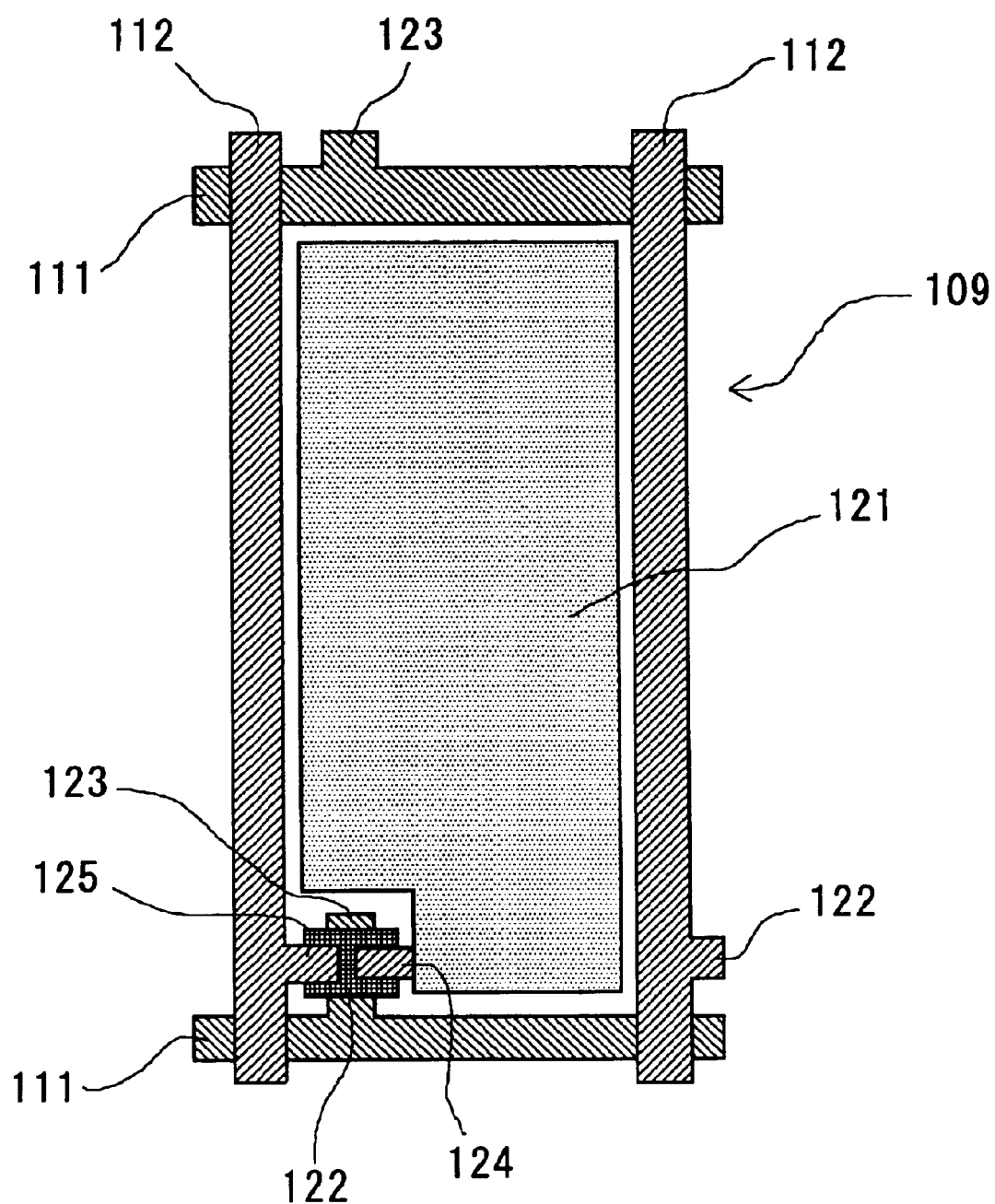
FIG. 10 is a schematic, enlarged plan view showing the pixel shown in FIGS. 7 to 9.

As shown in FIG. 10, each of the pixels 109 comprises a pixel electrode 121 and a switching transistor having a semiconductor island 122, a gate electrode 123, a source electrode 124, and a drain electrode 125. The pixel electrode 121, which is formed by a patterned, transparent, conductive film, is located in one of the areas defined by the scan lines 111 and the signal lines 112. The semiconductor island 122 is formed over the gate electrode 123 by way of the gate dielectric. The gate electrode 123 is connected to the corresponding scan line 111. The source electrode 124 is connected to the pixel electrode 121 and the semiconductor island 122. The drain electrode 125 is connected to the semiconductor island 122 and the corresponding signal line 712.

In the peripheral area 402, in addition to the sealing member 201, gate lines 103, drain lines 105, conductive light-blocking members 106a, 106b, and 106c, and the conductive transfers 202 are formed.

In the terminal formation area 403, gate terminals 102, drain terminals 104, and common terminals 110 are formed. The gaze terminals 102 are located on the left side of the substrate 101. The drain terminals 104 are located on the upper side of the substrate 101. The common electrodes 110 are located on both the upper and left side of the substrate 101 As shown in FIGS. 7 and 8, the gate lines 103 interconnect the gate terminals 102 with the scan lines 111 The drain lines 105 interconnect the drain terminals 104 with the signal lines 112.

As clearly shown in the cross-sectional view of FIG. 6, a dielectric layer 107 is formed on the lower substrate 101 to cover the gate lines 103, the drain lines 105, and the light-blocking members 106a, 106b, and 106c. On the upper substrate 301, an opposite light-blocking member 302 is formed to extend along the sealing member 201 in the periphery. Thus, the member 302 is rectangular-frame shaped. An opposite common electrode 303 is formed on the substrate 301 to cover the member 302. A lattice-shaped black matrix (not shown) is formed on the substrate 301 within the area that is surrounded by the member 302 and opposite to the display area 401 of the lower substrate 101. The member 302 is opposite to the light-blocking members 106a, 106b, and 106c of the lower substrate 101.

The lower and upper substrates 101 and 301 are coupled together with the sealing member 201 while spacers 204 are dispersed in the liquid crystal layer 203 between the substrates 101 and 301. Conductive transfers 202 are formed to bridge the substrates 101 and 301. Each of the transfers 202 is fixed to the light-blocking member 106a, 106b, or 106c on the lower substrate 101 at its one end and to the opposite common electrode 303 at the other end on the upper substrate 301. The transfers 202 are used to supply the common voltage to the common electrode 303. The transfers 202, which are made of silver paste or the like, are located outside the sealing member 201 in the peripheral area 402.

To decrease the electrical resistance of the gate lines 103 and the drain lines 105, the width of these lines 103 and 105 is increased. At the same time, the interval of these lines 103 and 105 is increase as well. This is because the width increase narrows the interval of the lines 103 and 105 and as a result, the UV light for curing the sealing member 102 is more difficult to penetrate the peripheral area 402.

As shown in FIG. 7, the light-blocking member 106a, which is located at the upper left corner (i.e., the part a) of the lower substrate 101, interconnects the common terminals 110 near the gate terminals 102 with the common terminals 110 near the drain terminals 104. The member 106a has a deformed rectangular plan shape. To facilitate the irradiation of the UV light to the sealing member 201, rectangular holes 601 are formed to penetrate the member 106a. The holes 601 are regularly arranged along the L-shaped part of the sealing member 201 in such a way as to be overlapped with the sealing member 201. One end of the transfer 202 is connected to the member 106a not to overlap with the sealing member 201. The transfer 202 is located outside the member 201.

As shown in FIG. 8, the light-blocking member 106b is located at a position (i.e., the part b) between one set of the drain terminals 104 and its adjoining set of the drain terminals 104. The member 106b interconnects the common terminals 110 formed near the adjoining sets of the drain terminal 104 with each other. The member 106b has a triangular plan shape. To facilitate the irradiation of the UV light to the sealing member 201, rectangular holes 601 are formed to penetrate the member 106b. The holes 601 are regularly arranged along the elongated part of the sealing member 201 in such a way as to be overlapped with the sealing member 201. One end of the transfer 202 is connected to the member 106b not to overlap with the sealing member 201. The transfer 202 is located outside the member 201.

The light-blocking member 106b shown in FIG. 8 is arranged at other two positions also; one is on the upper side of the lower substrate 101 and another is on the left side of the lower substrate 101. Therefore, the total number of the members 106b is three.

As shown In FIG. 9, the light-blocking member 106c is formed to extend from the lower left corner of the substrate 101 to the upper right corner thereof along the lower and right sides of the substrate 101, including the part c. Thus, the member 106c has a shape of an approximately L character. The member 106c interconnects the common terminals 110 near the gate terminals 102 on the left side with the common terminals 110 near the drain terminals 104 on the upper side. To facilitate the irradiation of the UV light to the sealing member 201, rectangular holes 601 are formed to penetrate the member 106c. The holes 601 are regularly arranged along the L-shaped part of the sealing member 201 in such a way as to be overlapped with the sealing member 201. One end of each of the six transfers 202 is connected to the member 106c not to overlap with the sealing member 201. All the transfers 202 arc located outside the member 201.

The light-blocking members 106a, 106b, and 106c are connected to the opposite common electrode 303 on the upper substrate 301 by way of the corresponding conductive transfers 202, as shown in FIG. 6. Thus, the common voltage is supplied to the common electrode 303 by way of the transfers 202, the members 106a, 106b, and 106c, and the common terminals 110

As described above, the sealing member 201, which has a shape of rectangular frame, is formed to overlap with the gate lines 103, the drain lines 105, the common lines 110, and the light-blocking members 106a, 106b, and 106c.

In the LCD panel of the first embodiment, proper contrivance was applied to the shape and layout of the gate lines 103, the drain lines 105, and the light-blocking members 106a, 106b, and 106c, thereby controlling the transmission area of the UV light to be 25% of the total occupation area of the sealing member 201 or wider. Moreover, the interval of the holes 601 is set to be 80 µm or less. The reason of these limitations is as follows.

Specifically, the inventors found that the UV-curing resin of the sealing member 201 was fully cured when the quantity of the UV light irradiated to the member 201 per unit area was set at 1500 mJ/cm$^2$ or greater. Taking some margin into consideration, they found that 2000 mJ/cm$^2$ or greater was required for this purpose.

The effective quantity of the UV light irradiated to the sealing member 201 per unit area is given as the product of the total quantity of the UV light irradiated per unit area and the opening rate per unit area by the holes 601.

To cure the material of the sealing member 201 as desired, it is sufficient that the quantity of the UV light irradiated to the member 201 per unit area is 2000 mJ/cm$^2$ at the minimum. Therefore, even if the opening rate per unit area is insufficient, this problem can be solved by increasing the quantity of the UV light. In this case, however, it is preferred that the quantity of the UV light irradiated to the member 201 per unit area in 8000 mJ/cm$^2$ or less to prevent the curing time from being longer and to suppress the temperature rise of the substrate 101 or 301. As a result, the inventors found that the opening rate per unit area by the holes 601 should be 25% or higher which was derived from the relationship shown in FIG. 15.

Figure 16A:
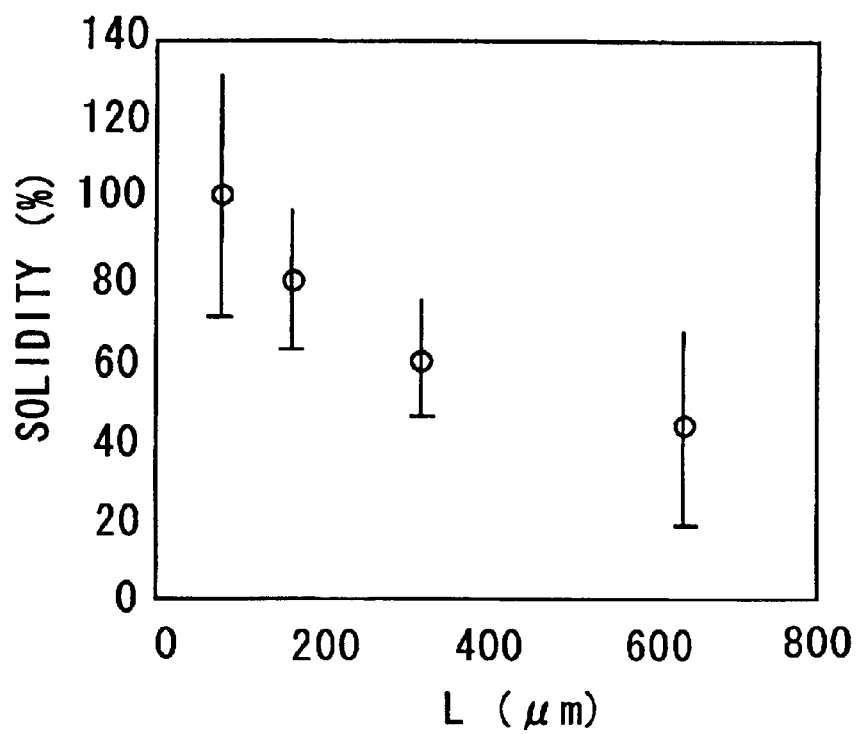
FIG. 16A is a graph showing the relationship between the pitch L of the penetrating holes with the solidity of the sealing member cured by irradiation of UV light in the LCD device according to the invention.
Figure 16B:
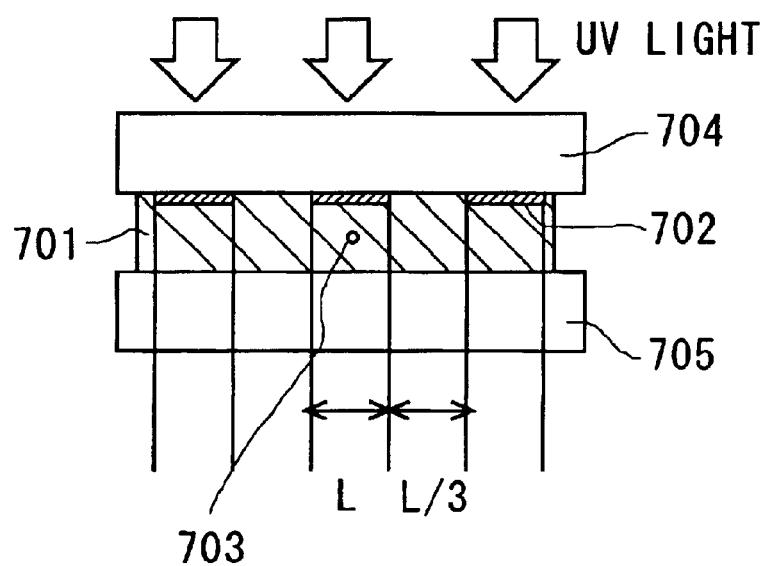
FIG. 16B is a schematic view showing the method used to obtain the graph of FIG. 16A.

Next, the inventors measured the solidity or hardness of the cured sealing member 201, as shown in FIG. 16B. In this measurement, the sealing member 701 was sandwiched by two solid plates 704 and 705 and the penetrating holes were formed by the patterned light-blocking member 702. The interval L of the holes was changed while the opening rate of the holes per unit area was fixed at 25%. The width of the holes was set at (L/3). As seen from FIG. 16B, the measurement was performed at the center 703 of the light-blocking part of the member 702.

The result of this measurement is shown in FIG. 16A. As seen from FIG. 16A, the interval L of the holes should be set at 80 µm or less. This is applicable to the case where the opening rate of the holes per unit area was greater than 25%.

Figure 11:
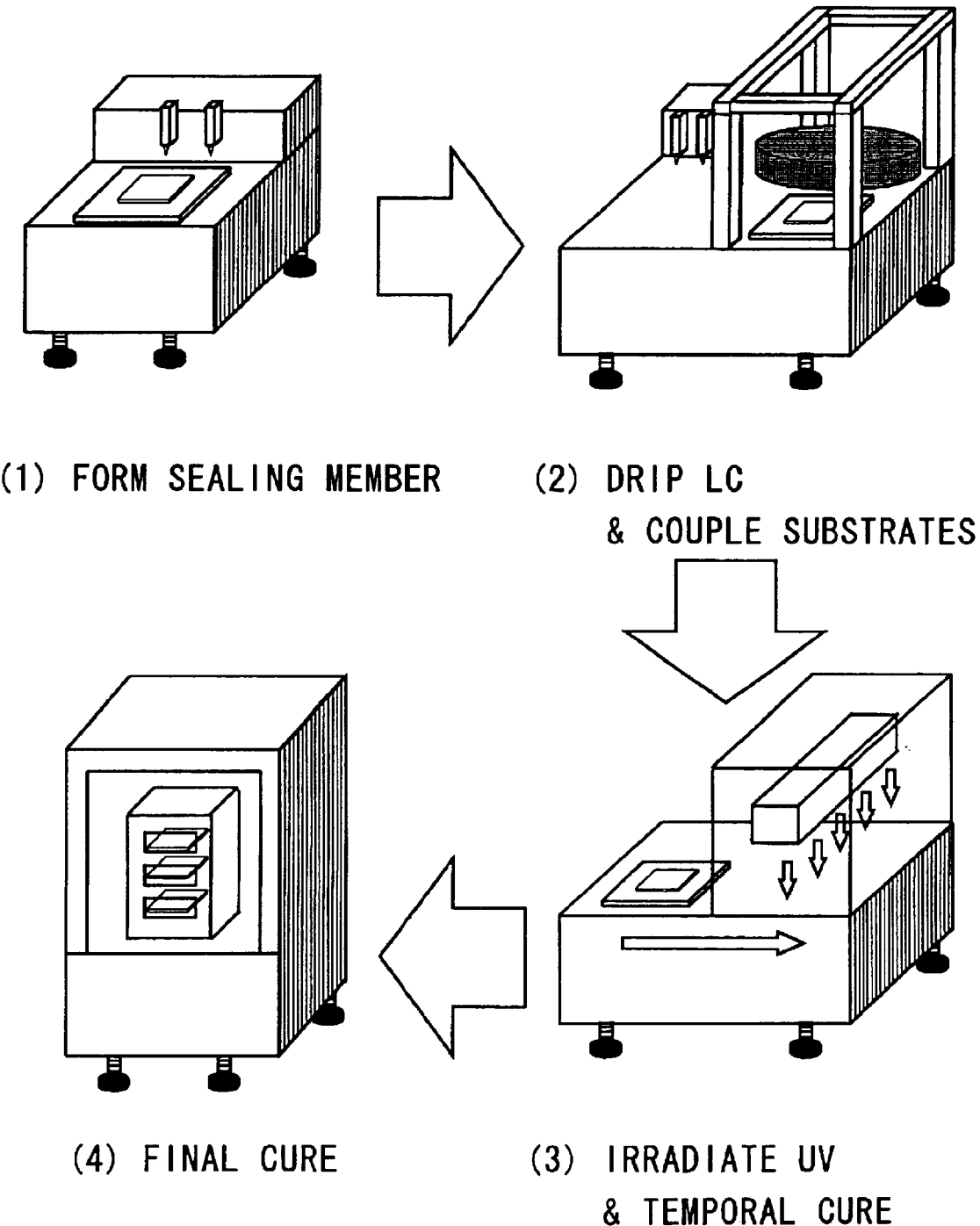
FIG. 11 is a schematic, perspective views showing the process steps of the method of fabricating the LCD device according to the first embodiment of FIG. 5.

Next, a method of fabricating the LCD panel of the LCD device according to the first embodiment is explained below with reference to FIG. 11.

In the step (1) of forming the sealing member 201, a UV-setting resin is continuously dripped in the peripheral areas 402 of the lower substrate 101 shown in FIG. 5 while changing the relative position of the substrate 101 to the dispensers, thereby writing the rectangular-frame-shaped sealing member 201 on the substrate 101. At this time, the resin i dripped in such a way as to have a width of 0.2 to 0.6 mm and a height of 10 to 50 µm.

Next, the step (2) of dripping the liquid crystal (LC) and coupling the lower and upper substrates 101 and 301 together is carried out. In this step, the specific liquid crystal is dripped in the area surrounded by the sealing member 201. On the other hand, the upper substrate 301, to which the spacers 204 have been attached or fixed, and the lower substrate 101 are aligned to each other in a vacuum atmosphere and pressed to each other with a pair of surface plates. The load of the plates is set at, for example, 200 to 3000 N. Thereafter, the substrates 101 and 301 thus aligned and pressed are returned to the atmospheric pressure, thereby coupling the substrates 101 and 301 together by the atmospheric pressure. The substrate 101 and 301 thus coupled are turned upside down for the next step (3).

Subsequently, the step (3) of irradiating the UV light and temporal curing the sealing member 201 is carried out. In this step, UV light is irradiated downwardly to the substrate 101 and 301 thus coupled and turned upside down in the form of straight line in a lump. Thus, the UV light is selectively irradiated to the sealing member 201 by way of the lower substrate 101 at the intensity of 5000 to 8000 mJ/cm$^2$, thereby curing the member 201. At this stage, as shown in FIG. 12, a UV mask 501 with a pattern 502 is used. The pattern 502 has an opening at the corresponding position to the sealing member 201. Thus, the UV light toward the display area 401 and the terminal formation area 403 of the lower substrate 101 is blocked while the UV light toward the peripheral area 402 thereof passes through the pattern 502. The opening of the pattern 502 is determined while taking the possible alignment error into consideration.

Since the UV light is selectively irradiated to the sealing member 201 by using the mask 501, possible bad effects by the UV light to the alignment layer in the display area 401 are effectively prevented.

The UV light thus irradiated by way of the mask 501 reaches efficiently the sealing member 201 through not only the gaps between the gate and drain lines 102 and 104 but also the penetrating holes 601 of the light-blocking members 106a, 106b, and 106c, thereby curing the UV-setting resin of the member 201. Furthermore, the UV light passed through the member 201 is reflected at the light-blocking member 302 on the upper substrate 301 and then, reaches the member 201 again. Thus, the UV light thus reflected contributes the curing reaction of the member 201. In the step (3), the sealing member 201 is cured temporally Subsequently, the step (4) of finally curing the sealing member 201 is carried out. In this step, the substrate assembly is subjected to a heat treatment at the substrate temperature of 120° C. for one hour. Thus, the sealing member 201 is finally cured, resulting in the LCD panel for the LCD device of the first embodiment.

With the LCD device according to the first embodiment, as described above, part of the gate lines 103 and part of the drain lines 105, which are relatively longer from the scan or signal lines 111 or 112 to the gate or drain terminals 102 or 104, are formed to be larger in width and wider in interval. Therefore, the UV light passes through the gaps between the lines 103 and 105 efficiently to reach the sealing member 201 while keeping the electrical resistance of the lines 103 and 105 at a desired low level.

Since the penetrating holes 601 are formed in the light-blocking members 106a, 106b, and 106c in such a way as to overlap with the sealing member 201, the UV light is irradiated to the member 201 efficiently by way of the members 106a, 106b, and 106c. Also, because of the holes 601, the intensity of the UV light to the member 201 is uniformized. This means that the curing action is well uniformized within the whole member 201. This prevents the defective operation of the LCD device due to the unsuccessful curing of the member 201.

If the holes 601 are simply formed in the light-blocking members 106a, 106b, and 106c, they raise the electrical resistance of the members 106a, 106b, and 106c. This will result in lowering of the common voltage at the common electrode 303. Moreover, the simple formation or the holes 601 degrades the light-blocking function of the members 106a, 106b, and 106c, allowing the external light to enter the display area 401 and deteriorating the display characteristic of the LCD device. Unlike this, the holes 601 are formed at the selected positions in the members 106a, 106b, and 106c in the first embodiment. Accordingly, the unsuccessful curing of the sealing member 201 is effectively suppressed to improve the display quality while keeping the electrical resistance of the members 106a, 106b, and 106c at a sufficiently low level and the light-blocking function at a desired high level.

In addition, if the substrates 101 and 301 are made of plastic having the lower heat resistance property than glass, an additional advantage is obtained. This is because the sealing member 201 can be fully cured by simply irradiating the UV light to the member 201.

If a transparent conductive film such as Indium Tin Oxide (ITO) is used for any conductive member of the device of the first embodiment, an additional advantage that the electrical resistance can be lowered is obtainable.

Second Embodiment

FIG. 13 shows a LCD device according to a second embodiment of the invention, in which the same reference numerals are attached to the same elements as those of the first embodiment. Therefore, the explanation about the same configuration is omitted for FIG. 13 shows the same cross-section as FIG. 12. As seen from FIG. 13, an opposite light-blocking member 302A is formed to extend along the sealing member 201 in the periphery of the upper substrate 301. Thus, the member 302A is rectangular-frame shaped. The opposite common electrode 303 is formed on the substrate 301 to cover the member 302. The lattice-shaped black matrix (not shown) is formed on the substrate 301 within the area that is surrounded by the member 302 and opposite to the display area 401 of the lower substrate 101. The member 302A is opposite to the light-blocking members 106 of the lower substrate 101. The members 106 have the same structure as the light-blocking members 106a, 106b, and 106c of the first embodiment, except that no holes are formed in the members 106.

As seen from FIG. 13, penetrating holes 601A are formed in the opposite light-blocking member 302A. No holes 601 are formed in the light-blocking members 106a, 106b, and 106c of the lower substrate 101.

In the LCD panel of the second embodiment also, like the first embodiment, the transmission area of the UV light is controlled to be 25% of the total occupation area of the sealing member 201 or wider and at the same time, the interval of the holes 601A is set to be 80 µm or less.

Next, a method of fabricating the LCD panel of the LCD device according to the second embodiment is explained below with reference to FIG. 13.

First, the lower and upper substrates 101 and 301 are coupled together in the same way as the first embodiment. Then, UV light is irradiated downwardly to the substrate 101 and 301 thus coupled in the form of straight line by way of the upper substrate 301 using the mask 501 with the pattern 502. Thus, the UV light is selectively irradiated to the sealing member 201 by way of the upper substrate 301, thereby curing the member 201. At this stage, as shown in FIG. 13, the UV light toward the display area 401 and the terminal formation area 403 of the lower substrate 101 is blocked while the UV light toward the peripheral area 402 thereof passes through the pattern 502.

The UV light thus irradiated by way of the mask 501 reaches efficiently the sealing member 201 through the penetrating holes 601A of the light-blocking member 302A, thereby curing the UV-setting resin of the member 201. Furthermore, the UV light passed through the member 201 is reflected at the light-blocking members 106 on the lower substrate 101 and then, reaches the member 201 again. Thus, the UV light thus reflected contributes the curing reaction of the member 201. In the step (3), the sealing member 201 is cured temporally.

Subsequently, in this step (4), the substrate assembly is subjected to the same heat treatment as the first embodiment. Thus, the sealing member 201 is finally cured, resulting in the LCD panel for the LCD device of the second embodiment.

With the LCD device according to the second embodiment, it is obvious that the same advantages as those in the first embodiment are obtainable.

Third Embodiment

FIG. 14 shows a LCD device according to a third embodiment of the invention, in which the same reference numerals are attached to the same elements as those of the first embodiment. Therefore, the explanation about the same configuration is omitted for simplification.

FIG. 14 shows the same plan view as shown in FIG. 9. As seen from FIG. 9, a vernier 108 is provided by penetrating holes 108a and 108b of the light-blocking member 106. The holes 108a and 108b are located to overlap with the sealing member 201. The holes 109a are strip shaped and arranged in a direction at equal intervals, forming a scale. The holes 108b are formed to write specific numbers (e.g., 0 and 1) or signs (e.g., + and −). The holes 108a and 108b are used to efficiently irradiate the UV light to the sealing member 201 by way of the light-blocking members 106.

The vernier 108 is used to check the width of the UV-setting resin for the sealing member 201 written on the lower substrate 101 and/or the relative position of the member 201 to the substrate 101. They are checked by reading the scale of the vernier 108 formed by the holes 108a and 108b). Preferably, the vernier 108 is provided at the position or positions where the light-blocking members 106a, 106b, and/or 106c are provided in the first embodiment.

With the LCD device according to the third embodiment, it is obvious that the same advantages as those in the first embodiment are obtainable. In addition, because of the vernier 108, the width of the UV-setting resin for the sealing member 201 written on the lower substrate 101 and/or the relative position of the member 201 to the substrate 101 can be checked without using any other measuring device.

Fourth to Sixth Embodiments

Figure 17:
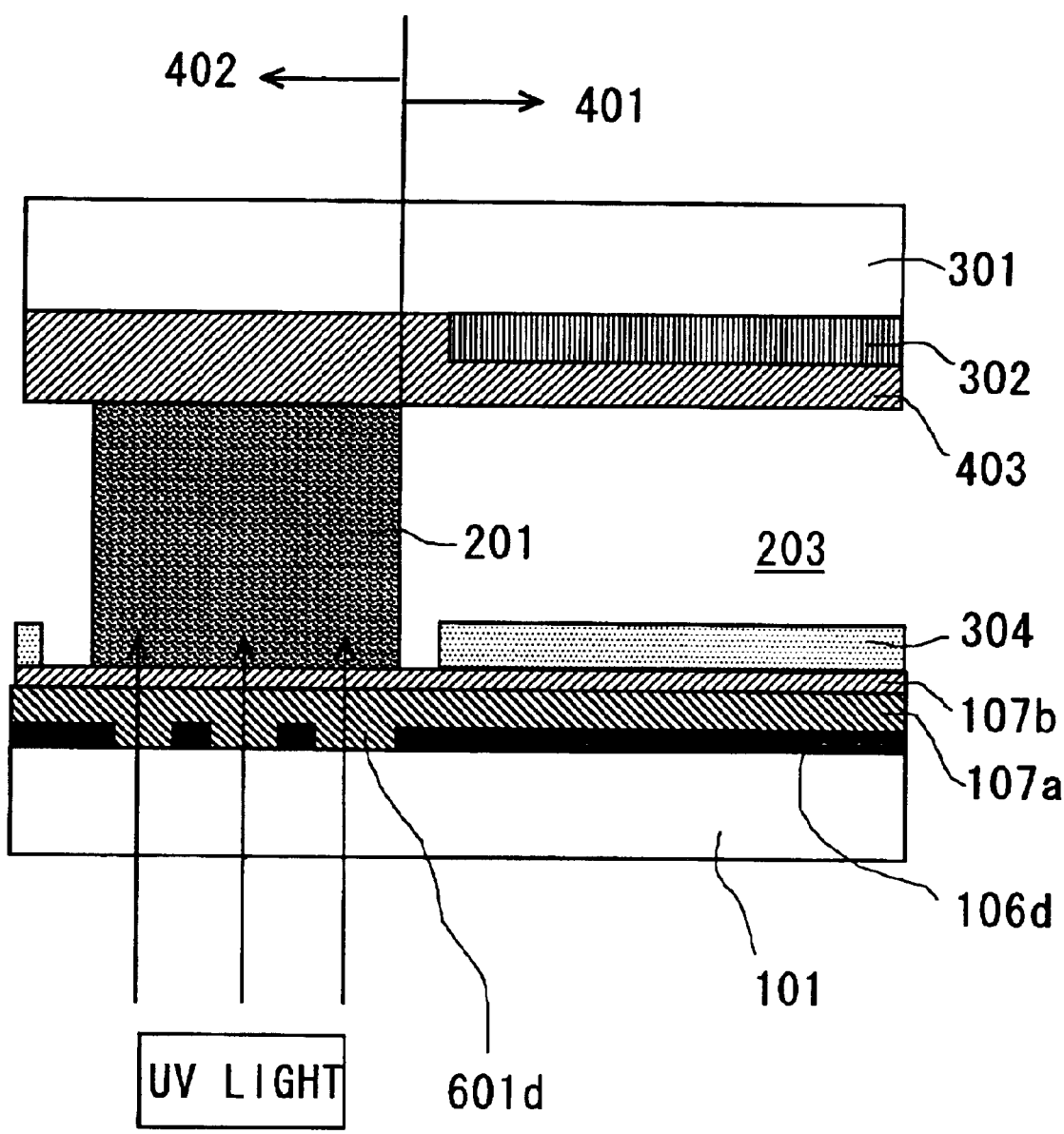
FIG. 17 is a schematic cross-sectional view showing a LCD device according to a fourth embodiment of the invention
Figure 18:
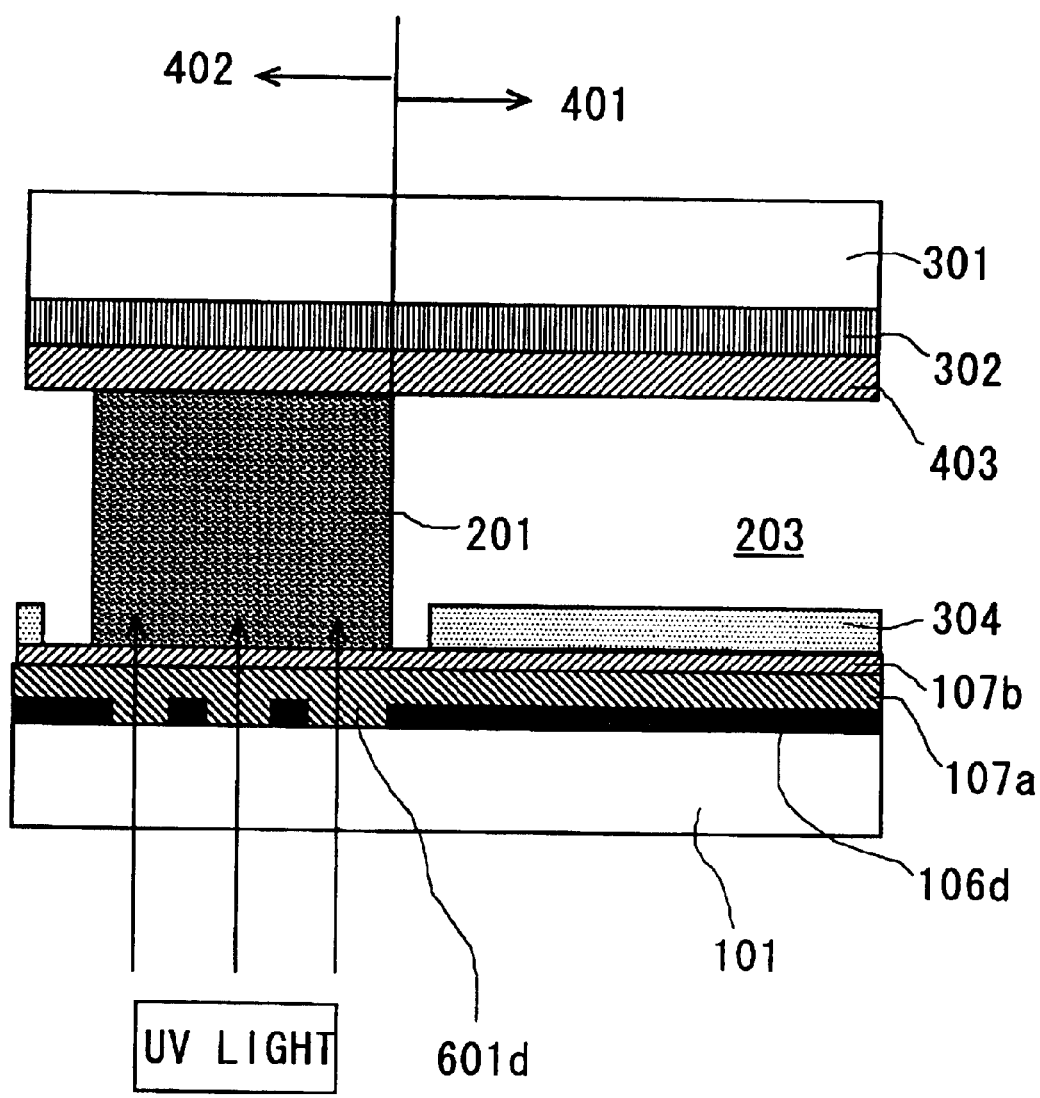
FIG. 18 is a schematic cross-sectional view showing a LCD device according to a fifth embodiment of the invention.
Figure 19:
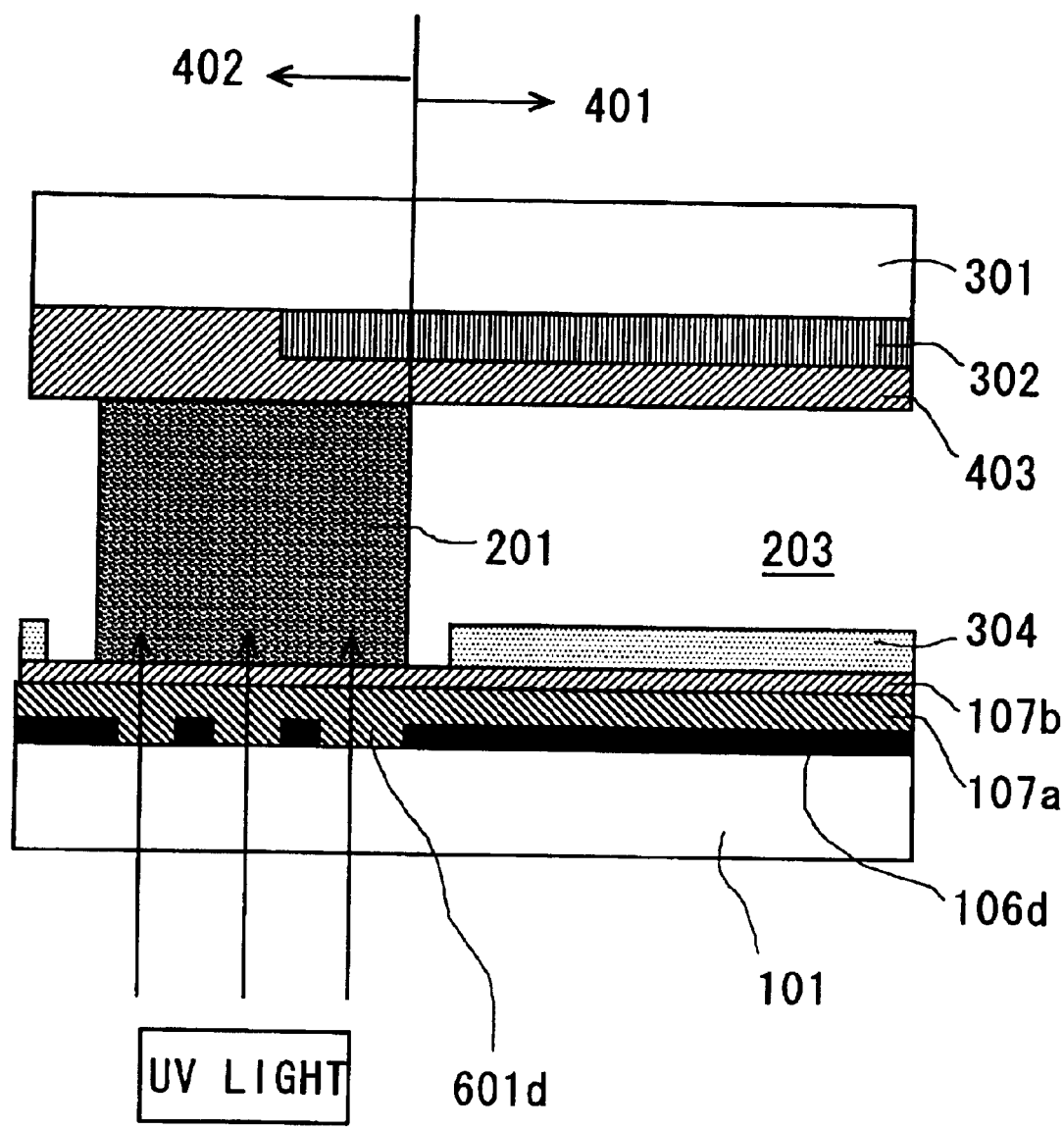
FIG. 19 is a schematic cross-sectional view showing a LCD device according to a sixth embodiment of the invention.

FIGS. 17 to 19 show LCD devices according to fourth to sixth embodiments of the invention, respectively, in which the invention is applied to the lateral electric-field type LCD devices.

With the growing need to increase the response speed of the LCD device, it has become more important to narrow the "cell gap". The "cell gap" is the gap between the lower and upper substrates 101 and 301, in other words, the thickness of the liquid crystal layer 203. The response time is proportional to the square of the cell gap. For example, if the cell gap is decreased from 4 µm to 3 µm, the response time is decreased to $(3/4)^2 = (9/16)$.

However, the cell gap narrowing increases the time for injecting liquid crystal. According to the inventors' test, if the cell gap is decreased to (½), the injection time is increased to five times as much as the initial injection time for the vacuum injection method. This disadvantage can be solved by using the dripping and coupling method.

The inventors found that the above-described first embodiment has the following disadvantage.

Specifically, the finished state of the holes 601 varies according to the fabrication lot. If the holes 601 are too small, the quantity of the UV light irradiated to the sealing member 201 tends to decrease. Thus, the problem of insufficient curing of the member 201 is not solved On the other hand, if the holes 601 are too large, the electrical resistance of the light-blocking members 106a, 106b, and 106c tends to increase. Therefore, another problem (e.g., crosstalk or flicker) will occur due to the propagation delay of electrical signals through the member 106a, 106b, 106c.

Accordingly, if the size of the LCD device in more large-sized, the requirement that the sealing member 201 in formed to overlap with the gate and drain lines 103 and 105 and the light-blocking members 106a, 106b, and 106c in such a way that the non-overlapping area of the sealing member 201 with the lines 103 and 105 and the members 106a, 106b, and 106c is equal to 25% per unit area of the member 201 or greater may be difficult to be realized.

In addition, this disadvantage does not occur in the above-described second embodiment. This is because the UV light is irradiated downwardly by way of the upper substrate 301 and therefore, the disadvantage of the electrical resistance increase does not take place. Accordingly, the opening rate (i.e., the size of the holes 601) can be set at a value with a sufficient margin not to be dependent on the fabrication lot.

The LCD devices according to the fourth to sixth embodiments are to ensure the uniform cell gap.

The inventors got the knowledge that the light-blocking member 302 on the upper substrate 301 has a relationship with the non-uniformity of the cell gap. Based on this knowledge, the inventors performed the test as follows.

The LCD devices according to the fourth to sixth embodiments of FIGS. 17, 18, and 19 have the same configuration as each other except for the structure of the opposite light-blocking member 302 on the upper substrate 301.

With the fourth embodiment of FIG. 17, on the lower substrate 101, a conductive light-blocking member 106d with penetrating holes 601d, a gate dielectric layer 107a, a passivation layer 107b, and an organic layer 304 are formed. The member 106d is formed on the surface of the lower substrate 101. The gate dielectric layer 107a is formed on the member 106d. The passivation layer 107b is formed on the gate dielectric layer 107a. The organic layer 304, which serves as an interlayer dielectric layer between the data lines (not shown) and the common electrode (not shown), is formed on the passivation layer 107b. Since the organic layer has a lower dielectric constant than an inorganic layer, the overall dielectric constant of the interlayer dielectric layer can be lowered. Also, the organic layer is formed more easily than an inorganic layer Thus, the organic layer 304 is used in this embodiment.

The holes 601d of the light-blocking member 106d are located in such a way as to be overlapped with the sealing member 201. Because of the holes 601d, the transmission area of the UV light is controlled to be 25% of the total occupation area of the sealing member 201 or wider.

On the upper substrate 301, an opposite light-blocking member 302 is formed in the display area 401. The member 302 does not extend to the peripheral area 403. An overcoat layer 403 is formed on the substrate 301 to cover the member 302. (If the LCD device is of the longitudinal electric-field type, the opposite common electrode 303 is formed instead of the layer 403, like the first to third embodiments.)

Although omitted in FIGS. 17 to 19 for simplification, orientation layers are formed on the inner surfaces of the lower and upper substrates 101 and 301, respectively. This is to control the orientation of the liquid crystal molecules in the liquid crystal layer 203. The orientation layers are located in only the display area 401.

Although not shown in FIGS. 17 to 19 for simplification, polarization plates are formed on the outer surfaces of the lower and upper substrates 101 and 301, respectively. The polarization plates are located in not only the display area 401 but also the overlapping area with the sealing member 201 in the peripheral area 402.

On the upper substrate 301, a lattice-shaped black matrix is formed in the display area 401. The light-blocking member 302 is united with the black matrix in this embodiment and thus, the member 302 may be said as the black matrix Although not shown in FIGS. 17 to 19 for simplification, the lower and upper substrates 101 and 301 are coupled together with the sealing member 201 in such a way that the liquid crystal layer 203 is sandwiched by the substrates 101 and 301. This is the same as shown in FIG. 6. Since the opposite electrode 303 is unnecessary for the lateral electric-field type, the transfers 202 are not formed.

The device of the fifth embodiment of FIG. 18 has the same configuration as the device of the fourth embodiment except that the light-blocking member (i.e., the black matrix) 302 reaches the end of the peripheral area 402 to entirely overlap with the sealing member 201.

The device of the sixth embodiment of FIG. 19 has the same configuration as the device of the fourth embodiment except that the light-blocking member (i.e., the black matrix) 302 extends to the peripheral area 402 to partially overlap with the sealing member 201.

The inventors fabricated the LCD devices according to the fourth to sixth embodiments of FIGS. 17, 19, and 19 practically and then, they carried out the following test.

In this test, UV light was irradiated to the sealing member 201 by way of the holes 601d of the light-blocking member 106d in each of the devices of FIGS. 17, 18, and 19, thereby curing the member 201 As a result, the following information was obtained.

(1) If part of the light-blocking member 106d is located in the overlapped region of the upper substrate 301 with the sealing member 201, as shown in FIG. 19, the cell gap non-uniformity is likely to occur.

(2) If the light-blocking member 106d is extended to cover the whole overlapped region of the upper substrate 301 with the sealing member 201, as shown in FIG. 18, the cell gap non-uniformity tends to occur. However, the tendency is lower than the case of (1).

(3) If the light-blocking member 106d is not extended to the whole overlapped region of the upper substrate 301 with the sealing member 201, as shown in FIG. 17, the cell gap non-uniformity scarcely occurs.

Based on the information (1) to (3), the following inference (i) to (iv) was drawn.

(i) The opposite light-blocking member 302 of the upper substrate 301 was formed by an organic layer with a thickness of approximately 1 $\mu$m. On the other hand, the light-blocking member 106d of the lower upper substrate 101 was formed by a metal layer with a thickness of approximately 0.2 $\mu$m. Therefore, even if the member 106d, which is formed by a comparatively thin, rigid metal layer, is overlapped with the sealing member 201, the cell gap non-uniformity is difficult to occur.

(ii) If the member 302 on the upper substrate 301, which is formed by a comparatively thick, less rigid organic layer, is partially overlapped with the sealing member 201 like the device of FIG. 19, the cell gap non-uniformity occurs. If UV light is irradiated to the sealing member 201 in this state, the cell gap tends to be relatively large in the overlapped region of the members 302 and 201 and relatively small in the non-overlapped area of the members 302 and 201. In the device of the sixth embodiment of FIG. 19, the cell gap tends to be relatively large in the right-hand part of the overlapped area of the members 302 and 201 and relatively small in the left-hand part thereof (iii) If the member 302 on the upper substrate 301 is entirely overlapped with the sealing member 201 like the device off FIG. 18, the cell gap non-uniformity is difficult to occur compared with the case of (ii). However, due to the comparatively large thickness of the member 302, there is a possibility that the member 302 has a thickness fluctuation that causes the cell gap non-uniformity. Therefore, if the member 302 having penetrating holes regularly arranged in the whole overlapped area with the sealing member 201 is used, approximately the same result as the case where the member 302 is entirely overlapped with the member 201 like the device of FIG. 18 is obtainable. In other words, the cell gap tends to occur more than the device of FIG. 17 and less than the device of FIG. 19.

(iv) When the member 302 has the penetrating holes regularly arranged in the whole overlapped area with the sealing member 201, the cell gap non-uniformity is likely to occur, if the period of the penetrating holes is too large. Taking the necessary period into consideration, it is thought to be similar to the intervals of the holes 601 of the light-blocking members 106a, 106b, and 106c of the above-described first to third embodiments. This is because the curing level of the member 201 will fluctuate according to the period of the holes of the member 32. As a result, the interval of the holes of the member 302 needs to be 80 μm or less.

Based on the above inference (i) to (iv), the following result was obtained.

(A) It is most preferred that the opposite light-blocking member 302 of the upper substrate 301 does not extend to the overlapped region of the upper substrate 301 with the sealing member 201 like the fourth embodiment of FIG. 17. This is applicable to both the case where the UV light is irradiated by way of the lower substrate 101 and the case where the UV light is irradiated by way of the upper substrate 301.

(B) As the second best measure, if the UV light is irradiated to the sealing member 201 by way of the lower substrate 101, it is preferred that the member 302 is formed to cover the whole overlapped region of the upper substrate 301 with the member 201 like the fifth embodiment of FIG. 18.

Figure 24:
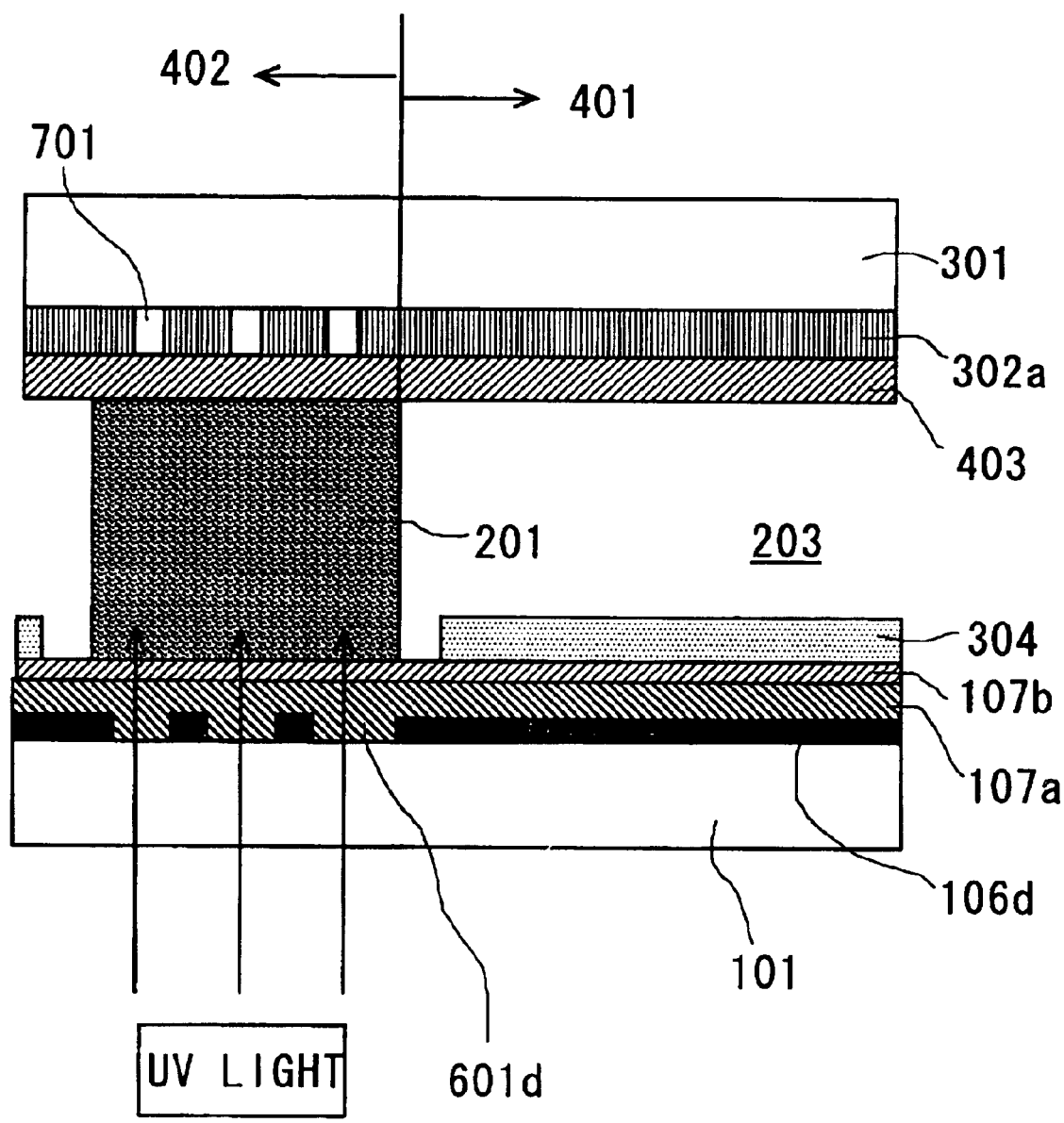
FIG. 24 is a schematic cross-sectional view showing a LCD device according to a tenth embodiment of the invention.

(C) As the third best measure, it is preferred that the member 302 is formed to cover the whole overlapped area of the upper substrate 301 with the member 201 and at the same time, penetrating holes are formed regularly in the member 302 at the intervals of 80 μm or less. This is applicable to both the case where the UV light is irradiated by way of the lower substrate 101 and the case where the UV light is irradiated by way of the upper substrate 301. The structure by this measure is shown in FIG. 24, in which the member 302 has regularly arranged holes 701 in the whole overlapped region wish the member 201.

Next, a method of fabricating the lower substrate 101 is explained below.

First, a molybdenum tungsten (MoW) layer with a thickness of 300 nm in formed on a transparent, dielectric plate (e g., glass plate) by the sputtering method. Then, this MoW layer is patterned by photolithography and etching techniques to form conductive patterns for the scan lines and the conductive light-blocking member 106d. The patterned MoW layer is termed the G-layer wiring layer.

Subsequently, a silicon oxide ($SiO_x$) layer with a thickness of 350 nm and a silicon nitride ($SiN_x$) layer with a thickness of 50 nm are successively formed on the G-layer wiring layer by the CVD (Chemical Vapor Deposition) method. The combination of the $SiO_x$ and $SiN_x$ layers serves as the gate dielectric layer 107a of the thin-film transistor (TFT) On the layer 107a, an amorphous silicon (a-Si) layer with a thickness of 50 nm is formed by the CVD method. The a-Si layer is used for forming the channel region of the TFT. An etching protection layer of $SiN_x$ with a thickness of 310 nm is formed on the a-Si layer by the CVD method and then, the protection layer is selectively etched to have a desired pattern by the photolithography and etching techniques.

Furthermore, a $n^+$-type a-Si layer with a thickness of 50 nm is formed on the etching protection layer thus patterned by the CVD method. Using the patterned etching protection layer as a mask, the $n^+$-type a-Si layer and the a-Si layer are selectively etched to have a desired pattern. An ITO (Indium Tin Oxide) layer with a thickness of 40 nm is formed by the sputtering method and then, it is patterned to have a desired shape by the photolithography and etching techniques.

Thereafter, the terminals for the scan lines or the like are formed by the photolithography and etching techniques. An aluminum (Al) layer with a thickness of 450 nm is formed by the sputtering method and then, it is patterned to have a desired shape by the photolithography and etching techniques.

Finally, a $SiN_x$ layer with a thickness of 200 nm is formed by the CVD method as the passivation layer 107b. Then, the $SiN_x$ layer is patterned to have a desired shape by the photolithography and etching techniques. Thereafter, the organic layer 304 is formed on the layer 107b by a know method. Thus, the lower substrate 101 is fabricated.

The pixel electrodes 121 are arranged in a matrix array in the display area 401 of the lower substrate 101.

Through the test for the device of the fourth to sixth embodiments of FIGS. 17 to 19, the inventors found that the organic layer 304 affects the cell gap uniformity also.

Specifically, an inorganic layer has a good adhesion property to the sealing member 201. However, the adhesion property to the member 201 of an organic layer is not so good. Taking this into consideration, the overcoat layer 403 is formed to cover the light-blocking member 302 (which is made of an organic material) in such a way as to be contacted with the sealing member 201 in the device structure of the fifth embodiment of FIG. 18. This is to separate the member 302 from the member 201. As a result, when the organic layer 304 is formed on the lower substrate 101 like the fourth to sixth embodiments of FIGS. 17 to 19, it is preferred that the layer 304 is not overlapped with the sealing member 201.

Figure 20:
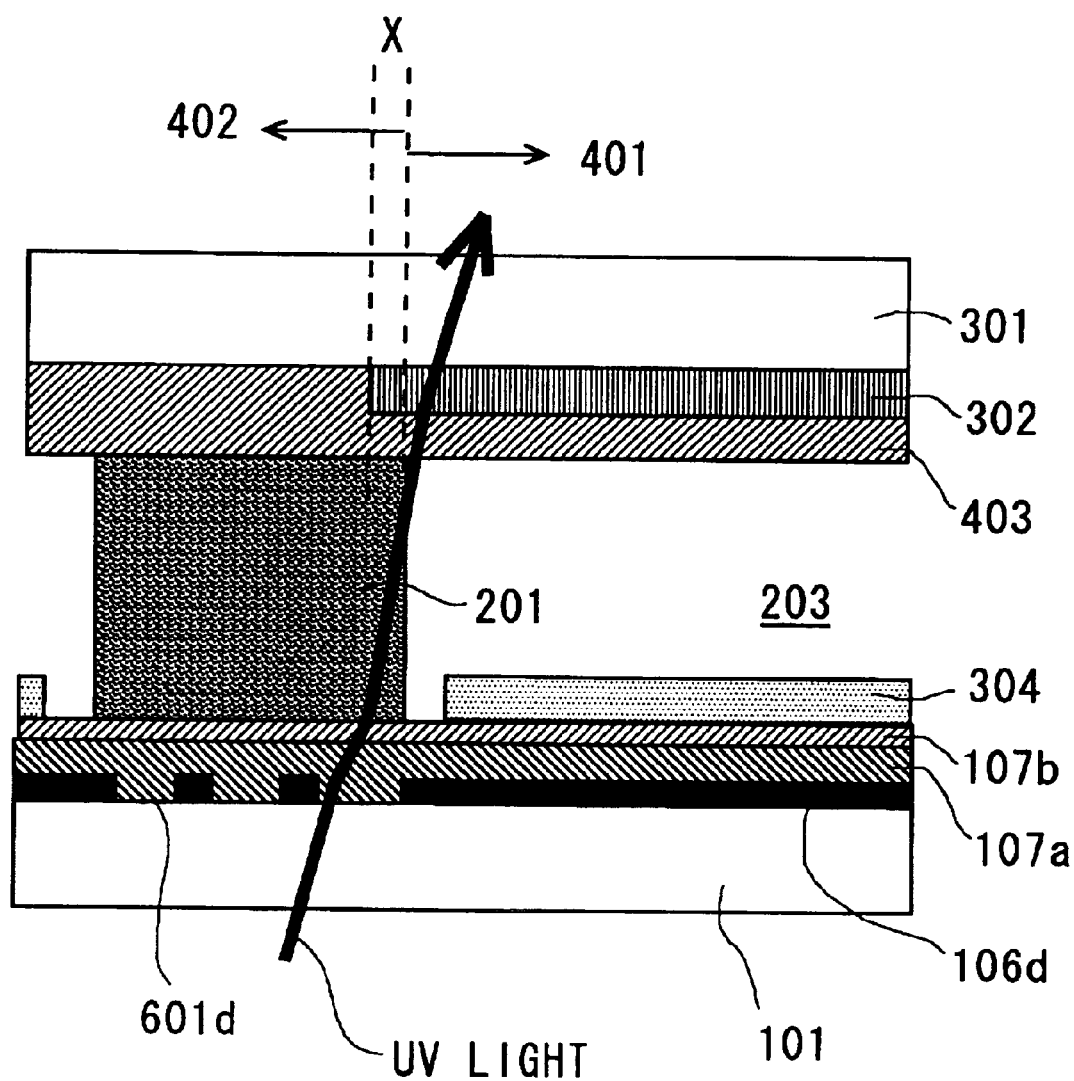
FIG. 20 is a schematic cross-sectional view showing a LCD device according to a seventh embodiment of the invention.

In the fourth embodiment of FIG. 17, the opposite light-blocking member 302 is not extended to the overlapped region of the upper substrate 301 with the sealing member 201. Therefore, it is necessary to check the leakage of the backlight into the display area 401. This is explained below with reference to FIG. 20. FIG. 20 is the same as FIG. 17 except that the width of the light-blocking member 302.

As shown in FIG. 20, to prevent the backlight leakage, the end of the member 302 is located in the overlapped region of the upper substrate 301 with the sealing member 201 by a protrusion or overlap length of X μm. Then, the inventors measured the proper value of X for preventing the defective display operation. The result of this measurement is shown in FIG. 21.

Figure 21:
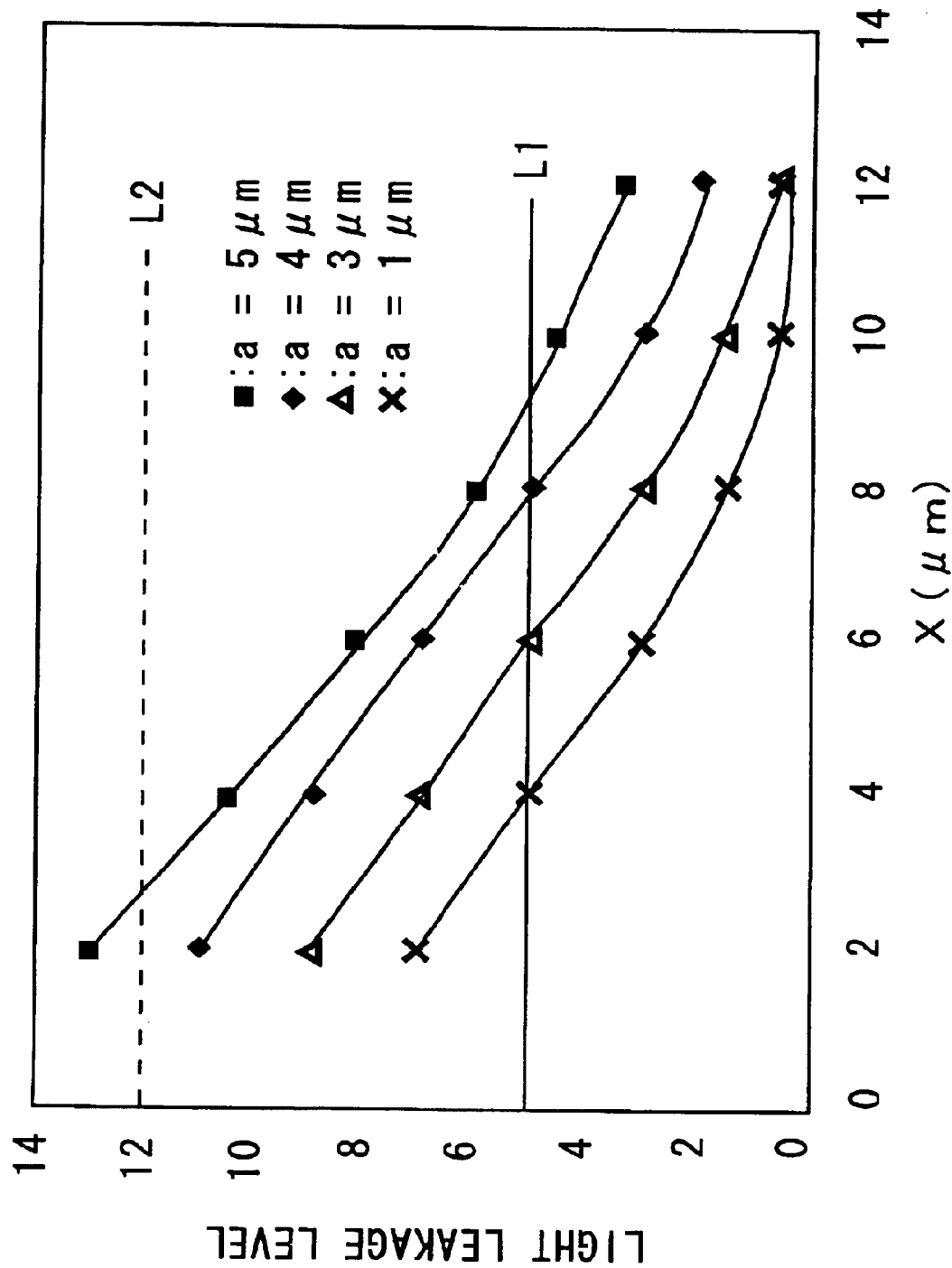
FIG. 21 in a graph showing the relationship between the overlapping width X of the sealing member with the light leakage level in the LCD device according to the seventh embodiment of FIG. 20.

The four curves in FIG. 21 show the relative values of the backlight leakage level as a function of the protrusion length X, in which the cell gap a in set at 1 μm, 3 μm 4 μm and 5 μm. If the leakage level is equal to or lower than the horizontal line L1 (at the level 5), it means that no leakage was recognized. If the leakage level is equal to or lower than the horizontal line L2 (at the level 12), it means that leakage was scarcely recognized.

From the result of FIG. 21, the following information is derived. Specifically, if the protrusion length X is equal to or larger than the current value of the cell gap a (i.e., X≧a), the above-identified problem is scarcely solved. If the protrusion length X is equal to or larger than twice the current value of the cell gap a (i.e., X≧2a), the above-identified problem is completely solved.

When the UV light is irradiated to the sealing member 201 by way of the lower substrate 101, as explained previously, it is preferred that the opposite light-blocking member 302 on the upper substrate 301 does not exist in the overlapped region of the substrate 301 with the sealing member 201. In this case, however, the backlight leakage is likely to occur. Therefore, it is preferred that the member 302 is formed to protrude into the overlapped region by the length X, as shown in FIG. 20, where a ≦X≦2a.

Seventh Embodiment

A LCD device according to a seventh embodiment of the invention is shown in FIG. 20, in which the light-blocking member 302 on the upper substrate 301 is formed to protrude into the overlapped area by the length X, where a≦X≦2a.

In this embodiment, not only the backlight leakage can be prevented but also the cell gap non-uniformity is difficult to occur. This is because even if the member 302 is overlapped with the member 201, the member 201 ordinarily has a sufficient width of 1 mm to 2 mm compared with the length X of a to 2a.

If a lattice-shaped black strips with a specific width is provided on the upper substrate 301 in the display area 401, it is unnecessary that the member 302 is overlapped with the sealing member 201 like this embodiment of FIG. 20.

Eighth Embodiment

Figure 22:
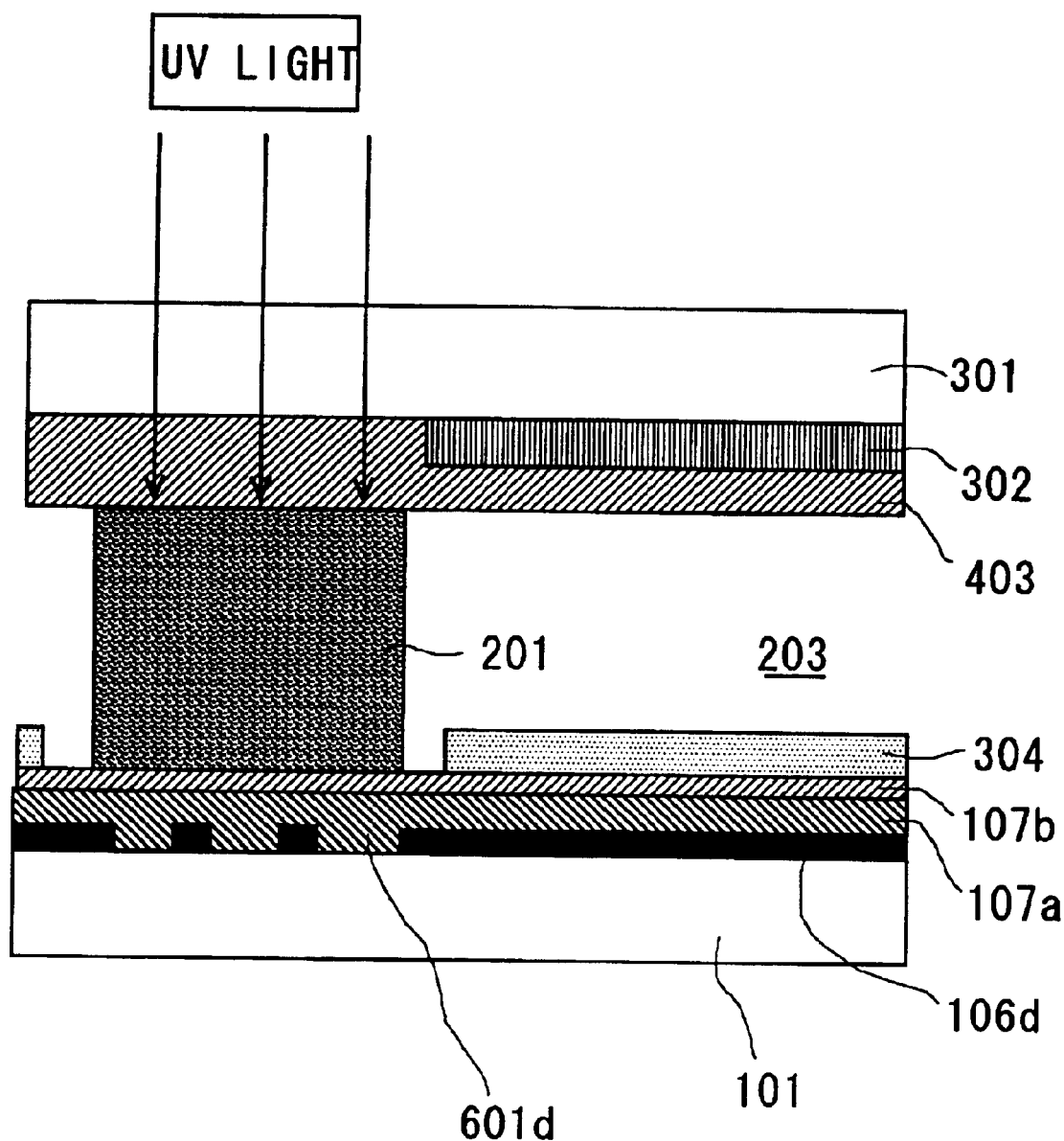
FIG. 22 is a schematic cross-sectional view showing a LCD device according to an eighth embodiment of the invention.

A LCD device according to an eighth embodiment of the invention is shown in FIG. 22, which has the same structure as the device of the fourth embodiment of FIG. 17 except that the UV light is irradiated to the sealing member 201 by way of the upper substrate 301.

In this embodiment, since the UV light is irradiated by way of the upper substrate 301, the holes 601d of the light-blocking member 106d may be eliminated. Rather, it is preferred that the holes 601d are eliminated.

Ninth Embodiment

Figure 23:
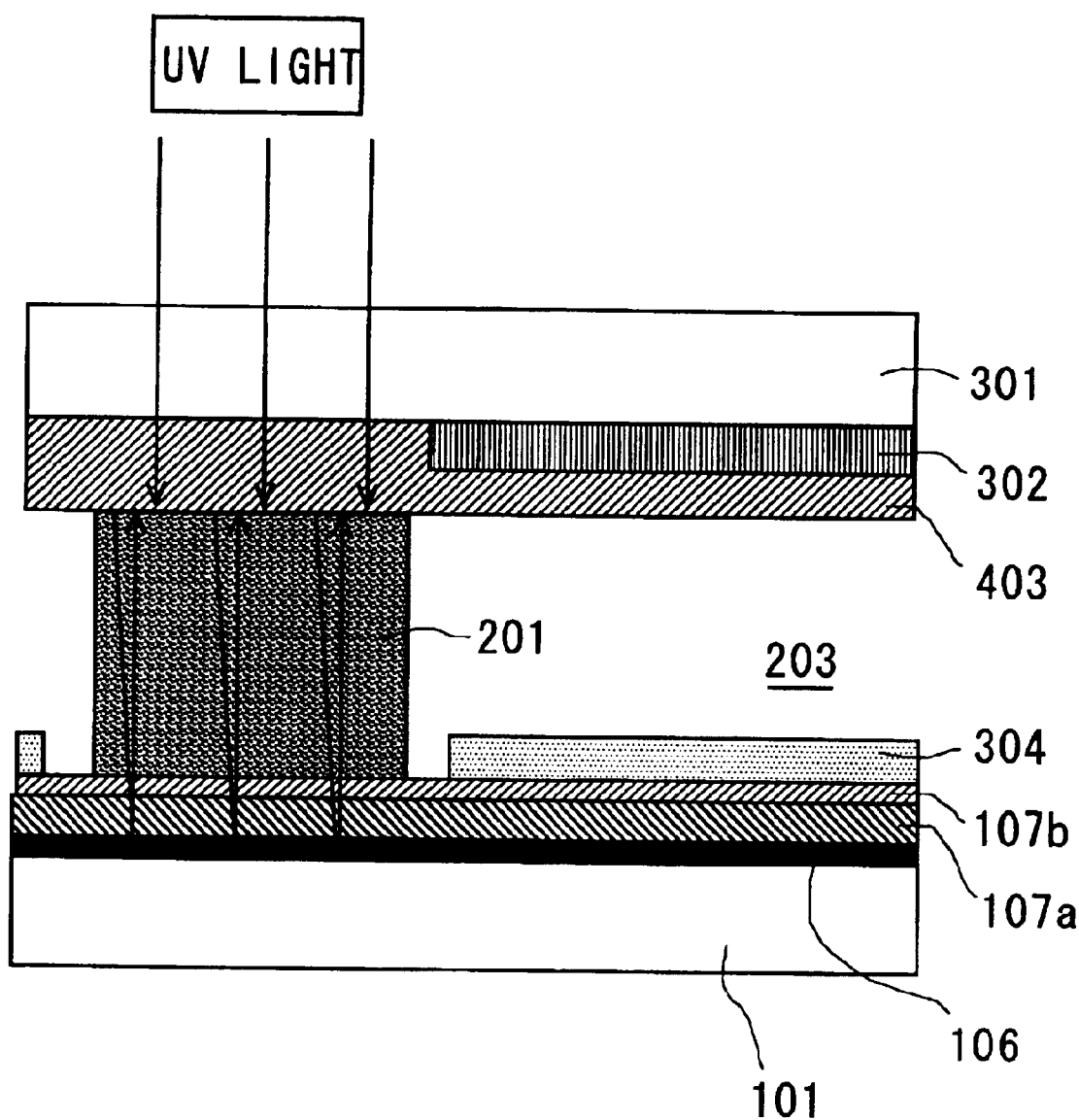
FIG. 23 is a schematic cross-sectional view showing a LCD device according to a ninth embodiment of the invention.

A LCD device according to a ninth embodiment of the invention is shown in FIG. 23, which has the same structure as the device of the fourth embodiment of FIG. 17 except that the holes 601d of the light-blocking member 106d are eliminated. Thus, instead of the member 106d, a light-blocking member 106e having no holes is provided.

In this embodiment, since the member 106e has no holes in the overlapped area of the lower substrate 101 with the sealing member 201, the UV light irradiated to the sealing member is reflected by the member 106e more efficiently than the eighth embodiment of FIG. 22. This leads to an additional advantage that the member 201 is cured better than the eighth embodiment of FIG. 22.

Tenth Embodiment

A LCD device according to a tenth embodiment of the invention is shown in FIG. 24, which has the same structure as the device of the fifth embodiment of FIG. 18 except that penetrating holes 701 are formed in an opposite light-blocking member 302a on the upper substrate 301.

Since the member 302a has the holes 701, the UV light may be irradiated to the sealing member 201 by way of the upper substrate 301.

In the above-described fourth to tenth embodiments, the invention is applied to the lateral electric-field type (lateral mode) LCD device. Compared with the vertical electric-field type (vertical mode) LCD device, the lateral electric-field type LCD device has a feature that the response speed is lower when the applied voltage is high (i.e., in the two-value mode) and higher when the applied voltage is low (i.e., in the half-tone mode). In general, the response time of the vertical mode device in the low voltage range is approximately four times the response time in the high voltage range. On the other hand, the response time of the lateral mode device in the low voltage range is approximately twice the response time in the high voltage range. Therefore, the lateral mode device is more preferred than the vertical mode device for displaying moving pictures in the half-tone mode. Moreover, the lateral mode device is more suitable to large-sized monitors than the vertical mode device because the former has a wider angle of field of view than the latter. Accordingly, in the future, the lateral mode device is more suitable to large-sized monitors and televisions (TVs).

The cell gap narrowing is essential for the lateral mode device to realize high-speed response required. Moreover, as described previously, the response time of the lateral mode device in the low voltage range is approximately twice the response time in the high voltage range and therefore, the effect or advantage that the response speed is enhanced obtained by narrowing the cell gap is more than the vertical mode device.

Because of the reason described here, the invention applicable to the lateral mode device is important and advantageous.

Variations

Needless to say, the present invention is not limited to the above-described embodiments. Any change or modification may be added to the embodiments within the spirit of the invention.

For example, in the above-described embodiments, the invention is applied to the TN-type LCD device; however, the invention is applicable to any other type of the LCD device (e.g., the lateral mode type or the vertical orientation type).

If the invention is applied to the lateral electric-field type like the fourth to tenth embodiments, the liquid crystal layer 203 is controlled by the electric field generated between the common electrode formed on the lower substrate 101 and the pixel electrodes 121 formed on the same substrate 101. Therefore, it is unnecessary to provide the structure for supplying the common voltage to the upper substrate 301 from the lower substrate 101. As a result, the transfers 202 can be omitted while the common voltage is supplied to the common electrode on the lower substrate 101 by way of the light-blocking members 106, 106a, 106b, and/or 106c.

Moreover, in the first to third embodiments, the invention is applied to the transmission type LCD device. However, it is needless to say that the invention is applicable to the reflection type LCD device where the external light entering through the upper substrate 301 is reflected by the reflection electrode on the lower substrate 101 for displaying operation.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A LCD device comprising:
   (a) a first substrate having a display area and a peripheral area located to surround the display area; the peripheral area including a sealing member wiring lines extended from the display area, and conductive light-blocking members;
   (b) a second substrate coupled with the first substrate; and
   (c) a liquid crystal layer formed between the first substrate and the second substrate; the liquid crystal layer being defined by the first substrate, the second substrate, and the sealing member;
   wherein the sealing member is formed to overlap with the wiring lines and the light-blocking members in such a way that a non-overlapping area of the sealing member with the wiring lines and the light-blocking members is equal to 25% per unit area of the sealing member or greater.

2. A LCD device, comprising:
   (a) a first substrate having a display area and a peripheral area located to surround the display area; the peripheral area including a sealing member, wiring lines extended from the display area, and conductive light-blocking members;
   (b) a second substrate coupled with the first substrate; and
   (c) a liquid crystal layer formed between the first substrate and the second substrate, the liquid crystal layer being defined by the first substrate, the second substrate, and the sealing member;
   wherein the sealing member is formed to overlap with the wiring lines and the light-blocking members in such a way that a non-overlapping area of the sealing member with the wiring lines and the light-blocking members is equal to 25% per unit area of the sealing member or greater;
   wherein the sealing member has non-overlapping regions with the wiring lines and the light-blocking members; and wherein the non-overlapping regions are apart from each other at intervals of 80 $\mu$m or less.

3. The device according to claim 1 wherein one of the light-blocking members is located near one corner of the display area and has penetrating holes at a location that overlaps with the sealing member and wherein the holes are arranged along the sealing member.

4. The device according to claim 1 wherein one of the light-blocking members is located between a set of the wiring lines and another set thereof and has penetrating holes at a location that overlaps with the sealing member; and wherein the boles are arranged along the sealing member.

5. The device according to claim 1 wherein one of the light-blocking members is elongated along the sealing member and has penetrating holes at a location that overlaps with the sealing member; and wherein the holes are arranged along the sealing member.

6. The device according to claim 1 wherein the wiring lines are extended outwardly from the display area in such a way as to overlap with the sealing member;
   and wherein a first set of the wiring lines has a first width and is arranged at a first pitch, and a second set of the wiring lines has a second width greater than the first width and is arranged at a second pitch greater than the first pitch.

7. The device according to claim 1 wherein an opposite light-blocking member is formed on the second substrate; and wherein the opposite light-blocking member has penetrating holes at a location that overlaps with the sealing member.

8. The device according to claim 1 wherein the penetrating holes of at least one of the light-blocking members are formed to define a vernier.

9. The device according to claim 1, further comprising a mask element having at least one opening disposed in a pattern that allows light to reach said non-overlapping regions of the sealing member but blocks light from reaching said display area.

10. A LCD device, comprising:
    (a) a first substrate having a display area and a peripheral area located to surround the display area; the peripheral area including a sealing member, wiring lines extended from the display area, and conductive light-blocking members;
    (b) a second substrate coupled with the first substrate; and
    (c) a liquid crystal layer formed between the first substrate and the second substrate; the liquid crystal layer being defined by the first substrate, the second substrate, and the sealing member;
    wherein the sealing member has non-overlapping regions with the wiring lines and the light-blocking members, and wherein the non-overlapping regions are apart from each other at intervals of 80 $\mu$m or less, the non-overlapping regions with the wiring lines and the light-blocking members being arranged regularly.

11. The device of claim 10, wherein the sealing member is formed to overlap with the wiring lines and the light-blocking members in such a way that a non-overlapping area of the sealing member with the wiring lines and the light-blocking members is equal to 25% per unit area of the sealing member or greater.

12. The device according to claim 10 wherein one of the light-blocking members is located near one corner of the display area and has penetrating holes at a location that overlaps with the sealing member; and wherein the holes are arranged along the sealing member.

13. The device according to claim 10 wherein one of the light-blocking members is located between a set of the wiring lines and another set thereof and has penetrating holes at a location that overlaps with the sealing member; and wherein the holes are arranged along the sealing member.

14. The device according to claim 10 wherein one of the light-blocking members is elongated along the sealing member and has penetrating holes at a location that overlaps with the sealing member; and wherein the holes are arranged along the sealing member.

15. The device according to claim 10 wherein the wiring lines are extended outwardly from the display area in such a way as to overlap with the sealing member;

and wherein a first set of the wiring lines has a first width and is arranged at a first pitch, and a second set of the wiring lines has a second width greater than the first width and is arranged at a second pitch greater than the first pitch.

16. The device according to claim 10, wherein an opposite light-blocking member is formed on the second substrate in such a way as to be overlapped with the sealing member; and wherein the light-blocking member is protruded into an overlapping region of the second substrate with the sealing member by a specific width X;

and wherein the width X satisfies a relationship of $a \leqq X \leqq 2a$, where a is a cell gap between the first and second substrates.

17. The device according to claim 10, further comprising a mask element having at least one opening disposed in a pattern that allows light to reach said non-overlapping regions of the sealing member but blocks light from reaching said display area.

* * * * *